(12) United States Patent
Imai et al.

(10) Patent No.: US 10,327,518 B2
(45) Date of Patent: Jun. 25, 2019

(54) MOLDED SURFACE FASTENER

(71) Applicant: YKK Corporation, Tokyo (JP)

(72) Inventors: Shinichi Imai, Toyama (JP); Ayumi Fujisaki, Toyama (JP); Hiromasa Abe, Toyama (JP); Kenta Okada, Toyama (JP); Mineto Terada, Toyama (JP); Tsuyoshi Minato, Macon, GA (US)

(73) Assignee: YKK Corporation (JP)

( * ) Notice: Subject to any disclaimer, the term of this patent is extended or adjusted under 35 U.S.C. 154(b) by 158 days.

(21) Appl. No.: 15/471,340

(22) Filed: Mar. 28, 2017

(65) Prior Publication Data

US 2017/0295890 A1    Oct. 19, 2017

(30) Foreign Application Priority Data

Apr. 13, 2016    (JP) .................................. 2016-080234

(51) Int. Cl.
| | |
|---|---|
| *A44B 18/00* | (2006.01) |
| *B60N 2/70* | (2006.01) |
| *B60N 2/72* | (2006.01) |
| *F16B 1/00* | (2006.01) |
| *F16B 5/06* | (2006.01) |

(52) U.S. Cl.
CPC ...... *A44B 18/0076* (2013.01); *A44B 18/0049* (2013.01); *A44B 18/0061* (2013.01); *A44B 18/0065* (2013.01); *B60N 2/7005* (2013.01); *B60N 2/7017* (2013.01); *B60N 2/72* (2013.01); *F16B 1/00* (2013.01); *F16B 5/0692* (2013.01); *F16B 2001/0028* (2013.01); *F16B 2001/0035* (2013.01)

(58) Field of Classification Search
CPC .. A44B 18/00; A44B 18/0073; A44B 18/0015
See application file for complete search history.

(56) References Cited

U.S. PATENT DOCUMENTS

| | | | | |
|---|---|---|---|---|
| 3,500,509 A | * | 3/1970 | Moden | A41F 1/02 |
| | | | | 156/253 |
| 3,650,647 A | * | 3/1972 | Jacobs | A41H 37/10 |
| | | | | 24/114.6 |
| 3,982,988 A | * | 9/1976 | Heimberger | A44B 19/40 |
| | | | | 156/500 |

(Continued)

FOREIGN PATENT DOCUMENTS

| | | | | |
|---|---|---|---|---|
| EP | 0222562 A2 | * | 5/1987 | ............ B29C 65/08 |
| EP | 0985362 A1 | * | 3/2000 | ......... A44B 18/0046 |

(Continued)

*Primary Examiner* — Jason W San
(74) *Attorney, Agent, or Firm* — Kilpatrick Townsend & Stockton LLP

(57) ABSTRACT

A molded surface fastener, in which many magnetic particles can be contained in a closer part with respect to a magnet of a molding die, and further a front surface and a rear surface can be easily identified, is provided. In the molded surface fastener of the invention, a magnetic region containing magnetic particles is formed on at least a part between right and left resin intrusion barrier portions, and a magnetic raised portion which is lower than engaging elements and contains the magnetic particles therein is disposed between the engaging elements adjacent in a length direction within the magnetic region.

12 Claims, 14 Drawing Sheets

(56) References Cited

U.S. PATENT DOCUMENTS

| | | | | |
|---|---|---|---|---|
| 4,735,753 | A * | 4/1988 | Ackermann | A41H 37/04 156/580.1 |
| 5,685,050 | A * | 11/1997 | Murasaki | A44B 18/0061 24/442 |
| 5,715,581 | A * | 2/1998 | Akeno | A44B 18/0061 24/442 |
| 6,827,893 | B2 * | 12/2004 | Clune | A44B 18/0049 24/442 |
| 8,898,869 | B2 * | 12/2014 | Idrizovic | A44B 18/0061 24/449 |
| 10,051,926 | B2 * | 8/2018 | Smith | A44B 18/0076 |
| 2002/0022108 | A1 * | 2/2002 | Krantz | A44B 18/0049 428/100 |
| 2005/0079321 | A1 * | 4/2005 | Tuman | A44B 18/0015 428/100 |
| 2005/0235462 | A1 * | 10/2005 | Takahashi | A41F 1/00 24/114.05 |
| 2006/0110562 | A1 * | 5/2006 | Roberts | A44B 18/0073 428/40.1 |
| 2008/0201919 | A1 * | 8/2008 | Horn | A61F 13/62 24/442 |
| 2010/0257704 | A1 * | 10/2010 | Tuma | A44B 18/0003 24/449 |
| 2012/0011685 | A1 * | 1/2012 | Rocha | A44B 18/0073 24/449 |
| 2013/0149490 | A1 * | 6/2013 | Cina | B32B 3/30 428/100 |
| 2014/0109356 | A1 * | 4/2014 | Fennell | H02G 3/32 24/449 |
| 2014/0130311 | A1 * | 5/2014 | Okuda | A44B 18/0049 24/449 |
| 2014/0137377 | A1 * | 5/2014 | Cheng | B29C 43/46 24/449 |
| 2014/0182093 | A1 * | 7/2014 | Cheng | A44B 18/008 24/449 |
| 2014/0298628 | A1 * | 10/2014 | Minato | A44B 18/0049 24/449 |
| 2015/0164186 | A1 * | 6/2015 | Cina | A44B 18/0076 24/449 |
| 2015/0201716 | A1 * | 7/2015 | Septien Rojas | B65D 33/2541 24/449 |
| 2015/0240863 | A1 * | 8/2015 | Chung | F16B 47/00 29/446 |
| 2015/0272284 | A1 * | 10/2015 | Rocha | A44B 18/0073 24/446 |

FOREIGN PATENT DOCUMENTS

| | | |
|---|---|---|
| JP | H08-56712 A | 3/1996 |
| WO | 2003/030672 A1 | 4/2003 |
| WO | 2012/025980 A1 | 3/2012 |

* cited by examiner

MOLDED SURFACE FASTENER

The present application claims priority to Japanese Patent Application No. 2016-080234, filed on Apr. 13, 2016 and entitled "Molded Surface Fastener," the entire contents of which are hereby incorporated by reference.

TECHNICAL FIELD

The invention relates to a molded surface fastener in which a plurality of hook-shaped engaging elements is disposed on a flat plate-shaped base portion.

BACKGROUND ART

Passenger seats of automobiles or trains, various kinds of sofas, office chairs and the like are often formed by attaching a skin material such as fiber fabric, or natural or synthetic leather to a surface of a cushion body (foam body) molded in a predetermined shape by using foam resin. The cushion body used in these various seats sometimes has a curved surface composed of a concave-convex shape satisfying human engineering factors in order to maintain a seating posture which provides no fatigue despite long-hour seating.

Furthermore, in a case that the skin material is attached to the surface of the cushion body, a method of covering and fixing the skin material to the surface of the obtained cushion body after molding the cushion body in a desired shape, is often employed. Particularly in this case, a molded surface fastener having a plurality of hook-shaped engaging elements is generally used as a means of fixing the surface of the cushion body and a rear surface of the skin material.

The molded surface fastener is formed, wherein a plurality of hook-shaped, male engaging elements is disposed on one surface of a base portion made of thermoplastic resin. Such a molded surface fastener is integrated to the surface of the cushion body such that the engaging elements are exposed by foam molding of the cushion body with a molding die in a state that the molded surface fastener is attached to a cavity surface of the molding die. On the other hand, a plurality of loop-shaped engaging elements (hereinafter loop-shaped engaging elements are referred to as loops) which can be fastened to the engaging elements of the molded surface fastener is provided on the rear surface of the skin material that covers the cushion body.

After the cushion body to which the molded surface fastener is integrated is covered with the skin material, the loops disposed on the rear surface of the skin material are pressed against the molded surface fastener disposed on the front surface of the cushion body, whereby the loops of the skin material are engaged with the hook-shaped engaging elements of the molded surface fastener, and the skin material is fastened to the molded surface fastener. In this manner, the skin material is easily fixed to the surface of the cushion body along a concave-convex shape of the front surface, which prevents the skin material from floating up from the cushion body.

As a means of attaching the molded surface fastener to the cavity surface of the foam molding die when foam molding the cushion body, it is conventionally carried out that a magnet is buried under a fastener attaching surface of the molding die, while a magnetic material attracted to magnetically by the magnet of the molding die is attached to the molded surface fastener, or the magnetic material is contained partially in the molded surface fastener.

As a means of attaching the magnetic material to the molded surface fastener, for example, it is known that a monofilament containing a magnetic material is fixed to a base portion of the molded surface fastener, a film containing a magnetic material is laminated on a base portion of the molded surface fastener, and that a magnetic material is applied to a flat plate-shaped base portion of the molded surface fastener, and others. In International Publication 2012/025980 (Patent Document 1), for example, a molded surface fastener in which a monofilament containing a magnetic material is fixed to a base portion is disclosed.

The molded surface fastener described in Patent Document 1 includes a thin plate-shaped base portion which is long in a front and rear direction, right and left barrier portions disposed at right and left side edge portions of the base portion and standing on the base portion along a length direction in order to prevent a foam resin material of a cushion body from intruding, a plurality of hook-shaped engaging elements disposed between the right and left barrier portions, a magnetic body holding portion protruded from the base portion on an inner side of the barrier portions, a lateral wall portion disposed along a width direction, and a fin piece portion extended outward in the width direction from right and left side edges of the base portion. Furthermore, a linear magnetic body formed of a monofilament containing magnetic particles is integrally fixed to the base portion along a length direction so as to be held by the magnetic body holding portion.

On the other hand, in a case that a magnetic material is partially contained in a molded surface fastener, a method of manufacturing the molded surface fastener by a two color molding using a synthetic resin material containing magnetic materials (magnetic particles) and a synthetic resin material containing no magnetic materials is generally employed, for example. The molded surface fastener manufactured by such a two color molding is disclosed in International Publication 2003/030672 (Patent Document 2).

In the Patent Document 2, a molded surface fastener 90 shown in FIG. 19 and FIG. 20 is described. The molded surface fastener 90 according to Patent Document 2 includes a thin plate-shaped base portion 91 which is long in a front and rear direction and a plurality of hook-shaped engaging elements 92 standing on an upper surface of the base portion 91. Furthermore, in a central part of the base portion 91 in a width direction, a plurality of magnetic projecting portions 93 containing magnetic particles is provided in a line along a length direction. A plurality of engaging elements 92 is disposed to be aligned on both right and left sides of these lining magnetic projecting portions 93.

Each of the magnetic projecting portions 93 is projected on the upper surface of the base portion 91 in a rectangular parallelopiped shape. Valley portions are provided between the magnetic projecting portions 93 adjacent in the length direction. In this case, the magnetic particles are mixed into synthetic resin at a predetermined ratio within each of the magnetic projecting portions 93 and supporting portions disposed under each of the magnetic projecting portions 93 on the base portion 91.

The molded surface fastener 90 according to Patent Document 2 containing the magnetic particles in this way, is moved closer to a fastener attaching surface of the molding die in which a magnet is arranged, for example, thereby a magnetic force is generated between the magnet of the molding die and the magnetic particles of the molded surface fastener 90. Thus, the molded surface fastener 90 can be attracted to the fastener attaching surface of the molding die magnetically and can be adhered and fixed to the fastener attaching surface. Afterwards, a cushion body to which the molded surface fastener 90 is integrated on a front surface is manufactured by foam molding of the cushion body in the molding die in a state that the molded surface fastener 90 is fixed to the fastener attaching surface of the molding die.

Furthermore, in Patent Document 2, a molded surface fastener wherein hook-shaped engaging elements containing magnetic particles instead of the magnetic projecting portions 93 shown in FIG. 19 and FIG. 20 are disposed in two lines along a length direction as a modification example of the molded surface fastener. In this case, the magnetic particles are contained within the engaging elements and a portion of a base portion supporting the engaging elements.

Since such a molded surface fastener as mentioned above is often required to have a high engaging strength when engaging with loop-shaped female engaging elements of skin materials or the like, a means of enhancing the engaging strength with respect to the loops has been considered for a long time. For example, a molded surface fastener wherein an engaging strength (disengaging strength) with respect to loops is enhanced by making it easier to catch the loops with hook-shaped engaging elements is disclosed in Japanese Patent Publication No. 8-56712 (Patent Document 3).

In the molded surface fastener according to Patent Document 3, a plurality of hook-shaped engaging elements stands on an upper surface of a flat plate-shaped base portion. In this case, the engaging elements align along a length direction to form an element row. Such a plurality of element rows formed along the length direction is disposed on the base portion in a width direction at a predetermined interval.

In the molded surface fastener according to Patent Document 3, a plurality of guide members distributing and guiding the loops to be engaged toward the hook-shaped engaging elements is provided between the element rows adjacent in the width direction. Each of the guide members of Patent Document 3 protrudes from the flat plate-shaped base portion in a medial position of two element rows adjacent in the width direction, and right and left side surfaces of each of the guide members are formed to be curved surfaces in which a width dimension of each of the guide members gradually decreases as getting closer to the base portion.

Since the molded surface fastener according to Patent Document 3 is provided with the guide members as mentioned above, when, for example, a female surface fastener having a plurality of loops is engaged with the molded surface fastener, the loops to be inserted between the adjacent element rows of the molded surface fastener can be guided with the guiding members toward the hook-shaped engaging elements and engaged. As a result, the hook-shaped engaging elements are able to catch and engage as many loops as possible, thereby an engaging strength (disengaging strength) with respect to the loops of the molded surface fastener can be enhanced. Furthermore, a molded surface fastener in which a guide member is disposed in a medial position of front and rear hook-shaped engaging elements is described in Patent Document 3 as a modification example.

PRIOR ART DOCUMENTS

Patent Documents

Patent Document 1: International Publication No. 2012/025980
Patent Document 2: International Publication No. 2003/030672
Patent Document 3: Japanese Patent Publication No. JP H8-56712

SUMMARY OF INVENTION

Problem to be Solved by the Invention

For example in a case of the molded surface fastener 90 according to Patent Document 2 wherein the magnetic projecting portions 93 are provided as shown in FIG. 19 and FIG. 20, the plurality of magnetic projecting portions 93 are provided in the central part in the width direction of the base portion 91 so as to be placed in a line along the length direction. However, the central part in the width direction of the molded surface fastener 90 is also a portion being able to catch generally, for example the loops of a female surface fastener. Therefore, the molded surface fastener 90 of Patent Document 2 in which the magnetic projecting portions 93 are projected on the central part in the width direction of the base portion 91 has a possibility of causing deterioration of an engaging strength with respect to the loops.

Furthermore, since the molded surface fastener 90 as shown in FIG. 19 and FIG. 20 are provided in the central part in the width direction of the base portion 91 with the plurality of magnetic projecting portions 93, a dimension of the molded surface fastener 90 in the width direction tends to be large. As a result, by the hard molded surface fastener 90 being easily exposed to a front surface of the soft cushion body widely when the molded surface fastener 90 is integrated to the cushion body, a feeling of the cushion body can possibly be affected.

Furthermore, for example in Patent Document 2, a molded surface fastener in which engaging elements containing magnetic particles instead of the magnetic projecting portions 93 are provided is disclosed as a modification example. However, in a case of the molded surface fastener in which the magnetic particles are contained in the engaging elements, a content of the magnetic particles in an upper portion apart from a base portion of the molded surface fastener tends to be small (in other words, a capacity of magnetic particles containable tends to be low).

In this case, the upper portion apart from the base portion of the molded surface fastener is the portion disposed in vicinity to the magnet disposed on the fastener attaching surface of the molding die when the molded surface fastener is attached to the fastener attaching surface of the molding die (hereinafter, the portion of the molded surface fastener can be referred to as a magnet vicinity portion).

Therefore, when the content of the magnetic particles of the molded surface fastener in the magnet vicinity portion is small as mentioned above, a magnetic force generated between the magnet disposed on the molding die and the molded surface fastener becomes small. As a result, an attaching position of the molded surface fastener with respect to the molding die is easily moved or the molded surface fastener is easily detached from the fastener attaching surface.

In the meantime, a molded surface fastener can be colored in a desired color (e.g. green) generally by pigment being contained in synthetic resin forming the molded surface fastener. In a case that the molded surface fastener contains magnetic particles, black or gray color exhibited by the magnetic particles is exposed to a portion containing the magnetic particles in contrast with the color of the molded surface fastener to be colored (e.g. green). In a case of the molded surface fastener 90 of Patent Document 2, for example, a portion of the base portion 91 containing magnetic particles and the magnetic projecting portion 93 exhibit black color (or gray color), while a portion formed only of synthetic resin containing no magnetic particles exhibits a desired color (e.g. green) colored by pigment and the like.

However, in Patent Document 2, the magnetic particles are exposed to both surfaces of a front surface and a rear surface of the molded surface fastener, thereby the color exposed to the front surface of the molded surface fastener and the color exposed on the rear surface look similar. Thus, the front surface and the rear surface of the molded surface fastener hardly become identified. As a result, for example, in a case of foam molding of the cushion body, an operator who attaches the molded surface fastener to the fastener attaching surface of the molding die easily mistakes the direction of the front surface and the rear surface of the molded surface fastener.

When the magnetic particles are exposed to the rear surface side of the molded surface fastener, the magnet disposed on the molding die attracts not only the front surface side but also the rear surface side of the molded surface fastener. Thus, even if the operator tries to attach the molded surface fastener in a correct direction, the molded surface fastener is likely overturned by an influence of the magnet and attached to the molding die in an opposite direction in a vertical direction. Therefore, the operator is required to make sure carefully whether the attaching direction of the molded surface fastener is correct. Consequently, deterioration of work efficiency and prolonging a working time have been occurred.

The present invention has been made in the light of the above problems, and its specific object is to provide a molded surface fastener which can secure high engaging strength stably with respect to loops, can contain more magnetic particles at a portion closer to a magnet of a molding die, and furthermore can identify a front surface and a rear surface easily.

Means for Solving the Problem

To achieve the above object, a molded surface fastener provided by the invention is, as a basic configuration, made of synthetic resin and integrated to a surface of a cushion body when foam molding of the cushion body, the molded surface fastener comprising: a flat plate-shaped base portion, right and left resin intrusion barrier portions standing along a length direction on an upper surface of the base portion, and a plurality of hook-shaped engaging elements disposed between the right and left resin intrusion barrier portions, and in which a magnetic region wherein magnetic particles are contained in the synthetic resin is formed along a length direction in at least a part between the right and left resin intrusion barrier portions, wherein a magnetic raised portion rising from the upper surface of the base portion such that a height dimension in a vertical direction is lower than the engaging elements and containing the magnetic particles therein is disposed between the engaging elements adjacent in the length direction within the magnetic region.

In particular, within the magnetic region of the molded surface fastener according to the present invention, it is preferable that the magnetic particles are contained in the engaging elements and a part of the base portion, and that a lower surface portion of the base portion is formed of synthetic resin not containing the magnetic particles or synthetic resin containing the magnetic particles at a ratio of 10 wt % or less.

In the molded surface fastener according to the invention, it is preferable that the engaging element comprises a rising portion rising from the base portion and a hook-shaped engaging head portion extending from an upper end of the rising portion so as to bend in a front and rear direction, and that the magnetic raised portion is formed between the engaging head portions of the adjacent engaging elements and is provided lower than a height position of a hook tip end of the engaging head portion in the engaging element.

In addition, it is preferable that a height dimension in a vertical direction of the magnetic raised portion from the base portion is set to be ¾ or less of a height dimension in a vertical direction of the hook tip end in the engaging element from the base portion. Furthermore, it is preferable that a height dimension in a vertical direction of the magnetic raised portion from the base portion is set to be ⅓ or more of a height dimension in a vertical direction of the engaging element from the base portion.

In the molded surface fastener according to the invention, it is preferable that a cross section orthogonal to a width direction of the magnetic raised portion is formed such that a dimension in a length direction of the magnetic raised portion gradually decreases as being apart from the base portion. Moreover, in the molded surface fastener according to the invention, a cross section orthogonal to a width direction of the magnetic raised portion may have a triangle, rectangular, or trapezoidal shapes.

Furthermore, in the molded surface fastener according to the invention, it is preferable that the magnetic region is disposed bisymmetrically about the center position along a length direction between the right and left resin intrusion barrier portions, and that a dimension in a width direction of the magnetic region is set to be 50% or more of an interval between the right and left resin intrusion barrier portions.

Further, in the invention, it is preferable that the plurality of engaging elements is disposed so as to align in a length direction and a width direction.

In this case, it is preferable that the magnetic raised portion is continuously provided along the width direction. Furthermore, the magnetic raised portion may be intermittently provided along the width direction at a predetermined interval.

Additionally, in the invention, it is preferable that the plurality of engaging elements and the plurality of magnetic raised portions are aligned in a length direction and disposed alternately in rows adjacent in a width direction.

Effects of the Invention

In the molded surface fastener according to the invention, the right and left resin intrusion barrier portions stand on the upper surface of the base portion along the length direction. The plurality of hook-shaped engaging elements stands from the base portion between these right and left resin intrusion barrier portions. Furthermore, in the molded surface fastener according to the invention, a magnetic region in which magnetic particles are contained at a predetermined ratio in at least a part of synthetic resin forming the base portion and the engaging elements is formed along the length direction at a predetermined width dimension in at least a part between the right and left resin intrusion barrier portions. In addition, the magnetic raised portion rising from the upper surface of the base portion between the front and rear engaging elements adjacent in the length direction within the magnetic region such that the height dimension in the vertical direction is lower than the engaging elements and containing the magnetic particles therein is provided.

Such a molded surface fastener according to the invention includes a plurality of engaging elements containing the magnetic particles and a plurality of magnetic raised portions. Therefore, even if magnetic projecting portions of Patent Document 2, for examples as shown in FIG. 19 and FIG. 20, are not provided, more magnetic particles can be contained in the portion (magnet vicinity portion) upwardly apart from the base portion of the molded surface fastener.

Therefore, a strong magnetic force can be generated between the molded surface fastener and a magnet disposed on the molding die when foam molding of the cushion body. Thereby, the molded surface fastener can be magnetically attracted powerfully and stably fixed to a fastener attaching surface of the molding die. In addition, the plurality of engaging elements can be disposed between the right and left resin intrusion barrier portions at an appropriate density. As a result, a high engaging strength with respect to loops can be stably secured.

Especially in this case, the magnetic raised portion is provided in the upper surface of the base portion such that the height dimension in the vertical direction is lower than the engaging elements. Therefore, even though the magnetic raised portion is disposed between the engaging elements, the magnetic raised portion hardly becomes an obstacle when the loops of the female surface fastener are engaged with the hook-shaped engaging elements. Thus, the loops can be engaged with the hook-shaped engaging elements smoothly and stably.

Especially in the invention, the molded surface fastener can be formed as a whole such that the magnetic particles are contained in the entire engaging elements, the entire magnetic raised portions, and a part of the base portion (for example, an upper surface portion or an upper half portion as an upper surface side region of the base portion) in the magnetic region, and at least a lower surface portion (or a lower half portion) as a lower surface side region of the base portion can be formed of only a synthetic resin containing no magnetic particles substantially. Therefore, a color shown in a front surface side of the molded surface fastener and a color shown in a rear surface side of the molded surface fastener can be differentiated.

More specifically, for example when a molded surface fastener is manufactured by an extrusion two color molding, generally, a molten synthetic resin material in which magnetic particles are kneaded in at a predetermined ratio is extruded continuously at a constant flow amount from an extrusion machine (such as an extrusion nozzle) along with a molten synthetic resin material containing substantially no magnetic particles. Thereby, the molded surface fastener is molded longwise along a machine direction (MD) as its length direction.

When, for example, a conventional general molded surface fastener including no magnetic raised portion is molded by such a two color molding, and at least a lower surface side region of a base portion is tried to be formed of only synthetic resin containing substantially no magnetic particles, a flat portion of the base portion on which no engaging elements stand has a smaller space for accommodating the magnetic particles than an element standing portion on which engaging elements stand. As a result, the magnetic particles are exposed to the lower surface side of the base portion.

That is, when molding the conventional general molded surface fastener, in the engaging element standing portion of the base portion, synthetic resin material in which the magnetic particles are kneaded is filled within a molding cavity of the engaging elements formed in a die wheel and the like. At the same time, a synthetic resin material containing substantially no magnetic particles is filled in a space for molding the base portion. Therefore, intrusion of the magnetic particles into the lower surface side region of the base portion can be suppressed.

On the other hand, the synthetic resin material in which the magnetic particles are kneaded at a constant ratio is extruded continuously at a constant flow amount (extrusion amount) from an extruding machine. However, molding cavities for the engaging elements are not provided in a flat portion of the base portion on which the engaging elements do not stand. Therefore, the magnetic particles have nowhere to go in the flat portion of the base portion, and are introduced to a space for molding the base portion forcibly. As a result, the magnetic particles are mixed in the entire base portion, thereby are inevitably exposed to the lower surface of the base portion. Therefore, due to an exposure of the magnetic particles to the lower surface of the base portion, a color shown on a front surface side of the molded surface fastener and a color shown on a rear surface side of the molded surface fastener likely look similar and thus, the front surface and the rear surface of the molded surface fastener hardly becomes identified.

In view of such a problem, a magnetic raised portion is provided between the engaging elements adjacent in the length direction in the invention. Therefore, even if the synthetic resin material in which the magnetic particles are kneaded is continuously extruded at a constant extrusion amount from the extruding machine during a molding process of the molded surface fastener, the extruded magnetic particles can be filled in molding cavities for the magnetic raised portions in a region between the engaging elements of the molded surface fastener. Consequently, as the magnetic particles hardly have nowhere to go, an exposure of the magnetic particles to the lower surface of the base portion as in the conventional molded surface fastener can be prevented (or suppressed) effectively.

Thus, the colors shown on the front surface and the rear surface of the molded surface fastener can be easily differentiated mutually in the invention. Therefore, the front surface and the rear surface of the molded surface fastener can be identified easily and certainly at a first sight. For example when the molded surface fastener of the invention is attached to the fastener attaching surface of the molding die for foam molding, an operator is able to attach the molded surface fastener easily to the molding die without a mistake of a direction of the front and rear surface. Consequently, an installing operation of the molded surface fastener with respect to the molding die can be conducted accurately in a short time and effectively, and thus work efficiency can be improved and working hours can be shortened.

Further in the above explanation, "synthetic resin including substantially no magnetic particles" means not only the synthetic resin including substantially no magnetic particles at all, but also the synthetic resin including magnetic particles at 10 wt % or less, desirably at 5 wt % or less. This is because there may be a case that the molded surface fastener of the invention is manufactured by reusing a synthetic resin in order to reduce an environmental loading.

For example, there may be some cases for molding a molded surface fastener that a completed product of a molded surface fastener partly containing magnetic materials (magnetic particles) is shredded and reused as a pellet for extruding resin positively containing no magnetic materials. In this case, a synthetic resin as a main material of the molded surface fastener sometimes contains some amount of the magnetic materials, therefore, the invention includes the molded surface fastener manufactured by such a recycling materials.

Each of the engaging elements of such a molded surface fastener in the invention includes a rising portion rising from the base portion and a hook-shaped engaging head portion extending from an upper end of the rising portion so as to bend a front and rear direction. The magnetic raised portion is formed between the hook-shaped engaging head portions of the adjacent engaging elements. Furthermore, the magnetic raised portion is provided to be lower than a height position of a hook tip end of the engaging head portion in the engaging elements. Therefore, when loops are engaged with the molded surface fastener of the invention, the low-formed magnetic raised portion hardly becomes an obstacle for the engagement of the loops. Thus, the loops can be engaged with each of the hook-shaped engaging elements smoothly and stably.

Furthermore, in the molded surface fastener of the invention, the height dimension in the vertical direction of the magnetic raise portion from the base portion is set be ¾ or less of the height dimension in the vertical direction of the hook tip end of the engaging elements from the base portion. Therefore, the loops can be engaged more smoothly and stably with the hook-shaped engaging elements disposed on the molded surface fastener of the invention.

In addition, the height dimension in the vertical direction of the magnetic raised portion from the base portion is set to be ⅓ or more of a maximum height dimension in the vertical direction of the engaging elements from the base portion. Therefore, the magnet vicinity portion of the molded surface fastener can contain many magnetic particles effectively.

Moreover, it is preferable that the cross section of each of the magnetic raised portions in the molded surface fastener of the invention orthogonal to a fastener width direction is formed to have a shape such that the dimension in the length direction of the magnetic raised portion gradually decreases as being apart from the base portion.

Since the cross section of the magnetic raised portion has a shape as mentioned above, the magnetic raised portion hardly becomes an obstacle for the engagement of the loops with respect to the hook-shaped engaging elements, while it can guide the loops contacting the magnetic raised portion toward the hook-shaped engaging elements disposed in the front and rear of the magnetic raised portion. As a result, the loops can be easily engaged (caught) with the hook-shaped engaging elements.

Each of the magnetic raised portions of the invention is formed such that the cross section orthogonal to a width direction has a triangle, rectangular, or trapezoidal shape. Since each of the magnetic raised portions has such a shape, larger amount of magnetic particles can be contained within each of the magnetic raised portions. Therefore, the molded surface fastener of the invention can be magnetically attracted and fixed more powerfully to the fastener attaching surface of the molding die. In this case, the triangle shape includes an approximately triangle shape or a mountain shape in which the upper end portion of the magnetic raised portion is formed to be a curved surface shape so as to be chamfered. Furthermore, the rectangular and the trapezoidal shapes include an approximately rectangular shape or an approximately trapezoidal shape in which corner portions are formed to be a curved surface shape so as to be chamfered.

The magnetic region in such a molded surface fastener of the invention is disposed bisymmetrically about the center position along a length direction between the right and left resin intrusion barrier portions, and a dimension of the magnetic region in a width direction is set to be 50% or more of an interval between the right and left resin intrusion barrier portions. Therefore, when the molded surface fastener of the invention is attached to the fastener attaching surface of the molding die, a powerful magnetic force can be generated between the molded surface fastener and a magnet of the molding die. At the same time, since the magnetic region is formed in the central part of the base portion in a width direction, a position and a direction of the molded surface fastener can be accurately automatically fitted corresponding to a position and a direction of the magnet of the molding die by the magnetic force generated between the magnetic region and the magnet of the molding die.

In addition, the plurality of hook-shaped engaging elements in the molded surface fastener of the invention is disposed so as to align in a length direction and a width direction. Therefore, the plurality of loops disposed on the female surface fastener can be stably engaged with the hook-shaped engaging elements of the molded surface fastener. Moreover, a desirable engaging strength (disengaging strength) can be stably secured.

In this case, the magnetic raised portion stands continuously along a width direction with a constant cross section. Therefore, the magnet vicinity portion, upwardly apart from the base portion of the molded surface fastener, can contain as many magnetic particles as possible effectively.

In the invention, the magnetic raised portions may be provided along a width direction intermittently at a predetermined interval. It also makes possible that the magnet vicinity portion, upwardly apart from the base portion of the molded surface fastener, can contain many magnetic particles. A deterioration of flexibility in a width direction of the molded surface fastener due to an installation of the magnetic raised portion can also be suppressed.

Furthermore in the invention, the plurality of engaging elements and the plurality of magnetic raised portions may be aligned in the length direction and placed in a zig-zag pattern by being disposed alternately in rows adjacent in a width direction. Such a molded surface fastener can stably engage with the plurality of loops disposed on the female surface fastener. In addition, a desirable engaging strength (disengaging strength) can be stably secured. Furthermore, a deterioration of flexibility in a width direction of the molded surface fastener due to an installation of the magnetic raised portion can be suppressed.

DESCRIPTION OF EMBODIMENT

Hereinafter, preferred embodiments of the invention are described in detail with Embodiments referring to drawings. It should be noted that the invention is not limited thereto, and various changes can be made as long as they have a substantially same structure and same functional effects. In the invention, for example, a length dimension and a width dimension of the molded surface fastener, and such a number, an installing position and a forming density of hook-shaped engaging elements disposed on the base portion of the molded surface fastener is not limited in particular, and can be changed arbitrarily.

Embodiment 1

Figure 1:
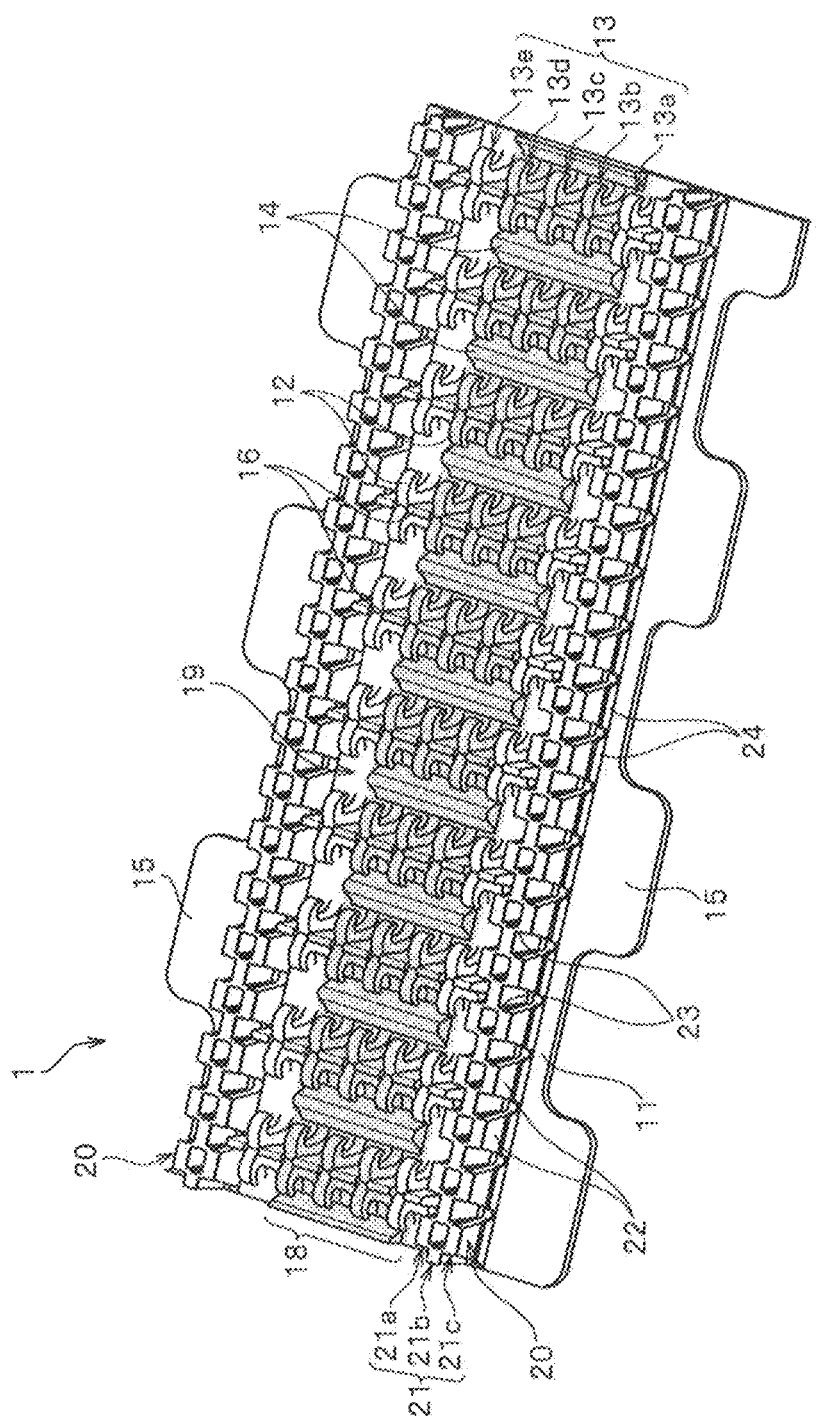
FIG. 1 is a perspective view illustrating a molded surface fastener according to Embodiment 1 of the invention.
Figure 2:
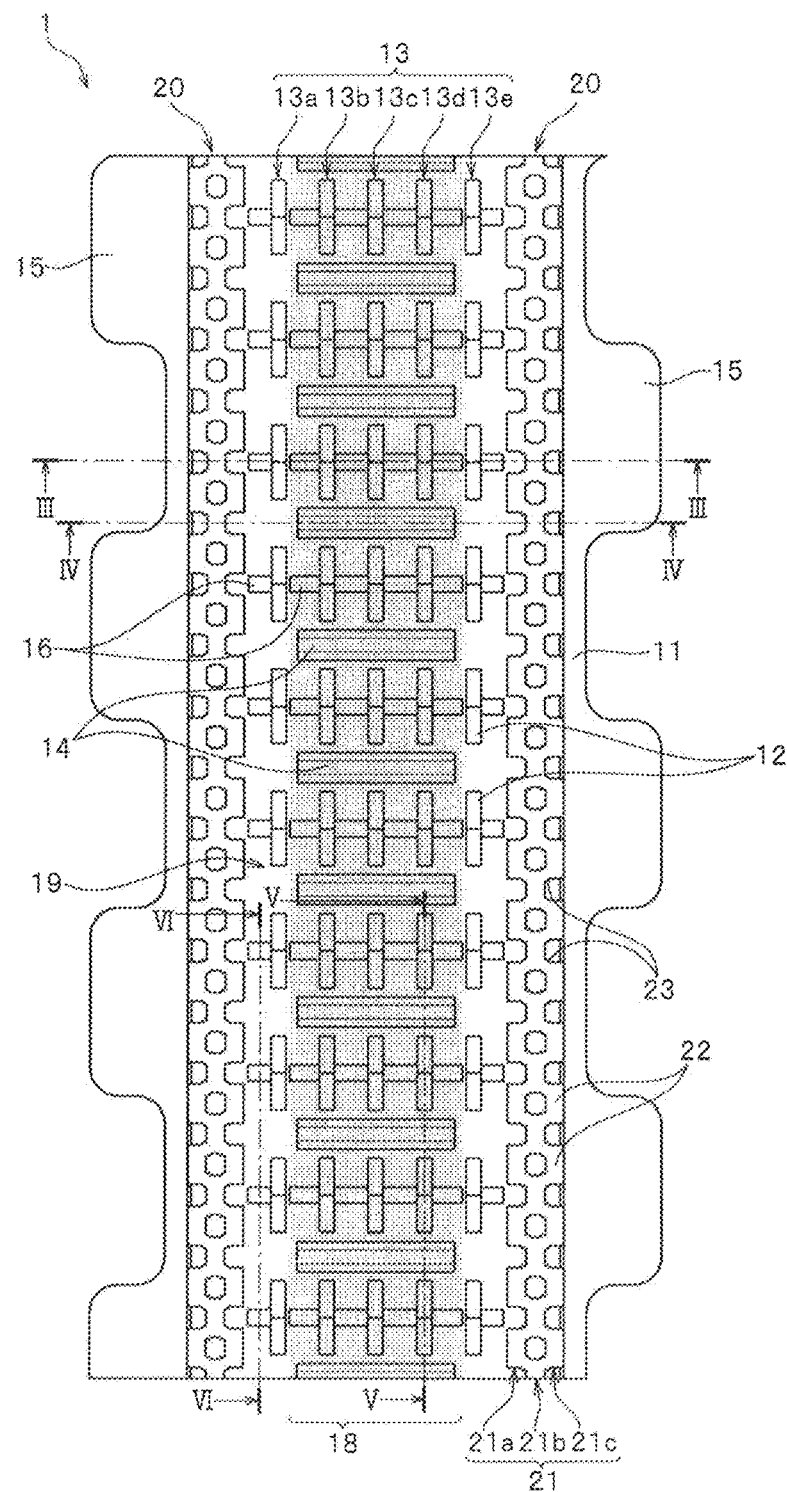
FIG. 2 is a plan view of the above molded surface fastener.

FIG. 1 is a perspective view illustrating a molded surface fastener according to Embodiment 1 of the invention. FIG. 2 is a plan view of the above molded surface fastener. FIG. 3-FIG. 6 are cross-sectional views of the molded surface fastener respectively.

It should be noted that, in the following explanation, a front and rear direction regarding the molded surface fastener and a primary molded body means a length direction (especially a length direction of the base portion) of the molded surface fastener and the primary molded body molded longwise as mentioned below. A right and left direction means being orthogonal to the length direction and a width direction along an upper surface (or a lower surface) of the base portion in the molded surface fastener. A vertical direction means being orthogonal to the length direction and a height direction (thickness direction) orthogonal to the upper surface (or the lower surface) of the base portion in the molded surface fastener. In particular, a direction in which the engaging element is formed with respect to the base portion is defined as an upper direction, and the opposite side is defined as a lower direction.

The molded surface fastener 1 according to Embodiment 1 includes a flat plate-shaped base portion 11 longwise in a front and rear direction, resin intrusion barrier portions 20 standing on right and left side edge portions of the base portion 11, a plurality of hook-shaped male engaging elements 12 disposed between the right and left resin intrusion barrier portions 20, lateral wall portions 16 disposed along a right and left directions, magnetic raised portions 14 disposed along a width direction between the engaging elements 12 adjacent in a length direction, and fin piece portions 15 extending outward in a width direction from right and left side edges of the base portion 11.

In the invention, a material of the molded surface fastener 1 is not particularly limited, while thermoplastic resins such as polyamide resin, polyester resin, polypropylene resin, PVC resin, ABS resin, polyethylene resin, or copolymers thereof can be used.

In the molded surface fastener 1 of Embodiment 1, a magnetic region 18 in which magnetic particles (ferromagnetic body) made of alloy of iron, cobalt, nickel and the like are contained (mixed) in a synthetic resin forming the molded surface fastener 1 is provided. In the invention, the material of the magnetic particles is not particularly limited as long as the material is attracted to a magnet 48 magnetically.

The magnetic region 18 in Embodiment 1 is formed along a length direction with a constant width dimension in a central part of the base portion 11 in a width direction. Here, the width dimension means a dimension of the molded surface fastener in a width direction. In the magnetic region 18, the magnetic particles are contained in at least a part of an upper surface portion (upper half portion) as a region of an upper surface side of the base portion 11, entire engaging elements 12, entire lateral wall portions 16, and entire magnetic raised portions 14. In each of the drawings, parts containing the magnetic particles in the molded surface fastener 1 are shown as gray.

The molded surface fastener 1 actually manufactured can be colored in a desirable color (e.g. green) when pigments and the like are contained in synthetic resin. Further, in the portion containing the magnetic particles in the molded surface fastener 1, black or gray color shown by the magnetic particles is expressed, compared with a color to be colored (e.g. green) of the molded surface fastener 1.

The magnetic region 18 of Embodiment 1 is formed bisymmetrically about the center position along a length direction between the right and left resin intrusion barrier portions 20. A width dimension of the magnetic region 18 is set to be between 50% and 90% of an interval between the right and left resin intrusion barrier portions 20.

Since a region of the magnetic region 18 is 50% or more of the above interval, a magnetic force can be stably generated between the molded surface fastener 1 and a magnet 48 disposed on a molding die 46 when foam molding of a cushion body as described later. Furthermore, since a region of the magnetic region 18 is 90% or less of the above interval, deterioration of flexibility and strength of the molded surface fastener 1 (especially the base portion 11) due to the inclusion of the magnetic particles can be suppressed, and proper flexibility and strength of the molded surface fastener 1 can be secured.

In Embodiment 1, it is preferable that a content ratio of the magnetic particles with respect to the synthetic resin within the magnetic region 18 is set to be between 40 wt % and 80 wt %, especially between 45 wt % and 70 wt %. Since the content ratio of the magnetic particles is 40 wt % or more, especially 45 wt % or more, the magnetic force can be stably generated between the magnet 48 of the molding die 46 and the molded surface fastener 1, and therefore the molded surface fastener 1 can be securely fixed to the molding die 46. Furthermore, since the content ratio of the magnetic particles is 80 wt % or less, preferably 70 wt % or less, the strength of the molded surface fastener 1 can be properly secured.

Figure 3:
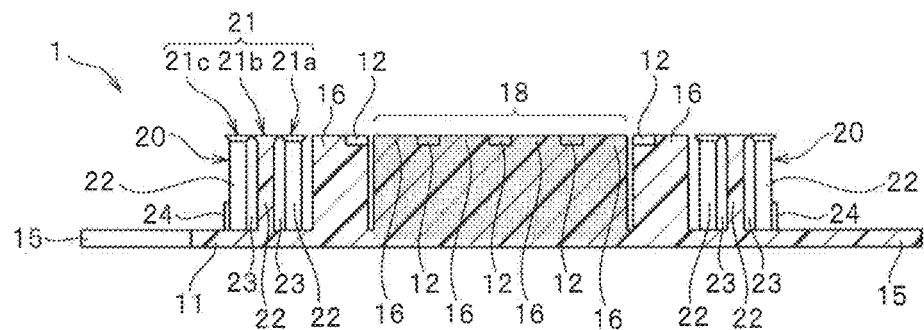
FIG. 3 is a cross-sectional view in line shown in FIG. 2.
Figure 4:
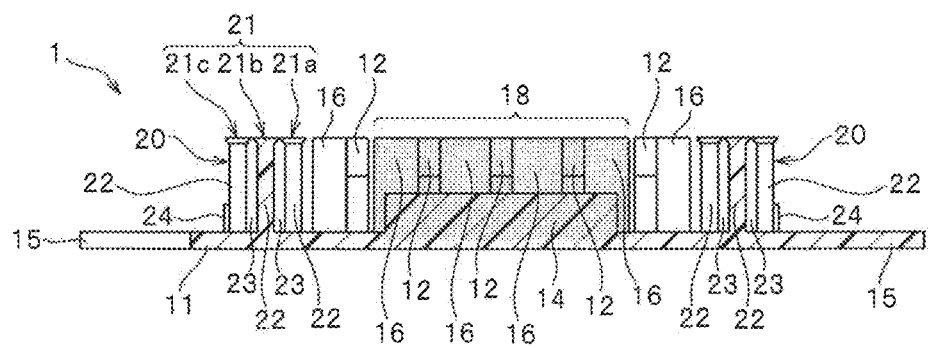
FIG. 4 is a cross-sectional view in IV-IV line shown in FIG. 2.
Figure 5:
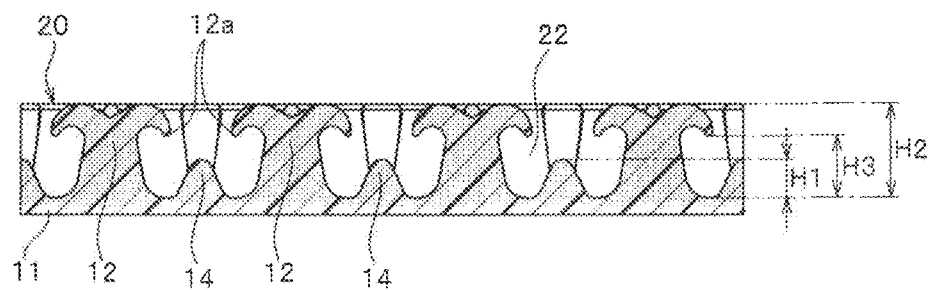
FIG. 5 is a cross-sectional view in V-V line shown in FIG. 2.
Figure 6:
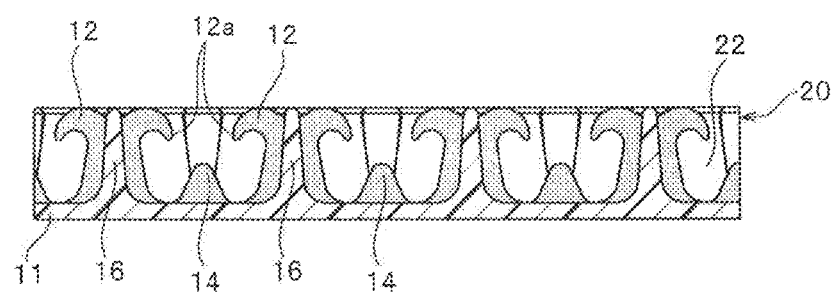
FIG. 6 is a cross-sectional view in VI-VI line shown in FIG. 2.

A region except for the magnetic region 18 of the molded surface fastener 1 is formed of synthetic resin containing substantially no magnetic particles. Especially in Embodiment 1, a lower surface portion (a lower half portion) as a lower surface side region of the thin base portion 11 is formed of the synthetic resin containing substantially no magnetic particles, as shown in FIG. 3-FIG. 5.

For example, when the molded surface fastener 1 is viewed in a plan view, the magnetic region 18 is formed to be exposed to the upper surface side of the molded surface fastener 1 at a constant width dimension as shown in FIG. 2. On the other hand, the magnetic region 18 is not formed in the lower surface side region of the base portion 11. Therefore, since the black or gray color of the magnetic particles hardly appears on the lower surface of the molded surface fastener 1, the lower surface shows the desired color (e.g. green) by the pigments mixed in the synthetic resin. Thus, the molded surface fastener 1 of Embodiment 1 can express different colors easily at a front surface (upper surface) side and a rear surface (lower surface) side.

In the invention, the magnetic region 18 may not be provided at all on the base portion 11. Alternately, the magnetic region 18 may be formed not only on the upper surface portion of the base portion 11 but also to spread to the lower surface portion. In this case, it is preferable that a size (cubic content) of the magnetic region 18 formed on the lower surface portion of the base portion 11 is smaller than a size (cubic content) of the magnetic region 18 formed on the upper surface portion.

Further in the invention, the above mentioned "synthetic resin containing substantially no magnetic particles" includes the synthetic resin containing magnetic particles at a content of 10 wt % or less, preferably 5 wt % or less, in addition to the synthetic resin containing no magnetic particles. This is because there is a case that the molded surface fastener 1 of the invention is manufactured by reusing products in order to reduce an environmental load.

For example, there may be some cases for molding the molded surface fastener 1 that a completed product of the molded surface fastener 1 partly containing the magnetic particles (magnetic materials) is shredded and reused as a pellet for extruding resin positively containing no magnetic materials. In this case, the synthetic resin as a main material of the molded surface fastener 1 sometimes contains some amount of the magnetic materials, therefore, the invention includes the molded surface fastener 1 manufactured by such a recycling materials.

Therefore, "magnetic region containing magnetic materials" in the specification means "region in which magnetic materials (magnetic particles) are contained in synthetic resin at a ratio of between 40 wt % and 80 wt %", and "region containing substantially no magnetic materials (non-magnetic region) means "region in which magnetic materials are contained in synthetic resin at a ratio of 10 wt % or less".

The base portion 11 of the molded surface fastener 1 of Embodiment 1 is formed to be flat plate-shaped with a small thickness dimension in a vertical direction. The upper surface and the lower surface of the base portion 11 are formed to be flat plate-shaped respectively. Furthermore in the invention, in order to enhance a fixing strength by securing a large bonding area between the molded surface fastener 1 and the cushion body when the molded surface fastener 1 is integrated to the cushion body, a plurality of concave groove portions or projecting rib portions parallel to a length direction can be provided on the lower surface of the base portion 11, for example as described in the Patent Document 1.

The right and left resin intrusion barrier portions 20 of Embodiment 1 are provided along a front and rear direction at a position close to and slightly inside of right and left side end edges in the base portion 11. In the invention, the position of the right and left resin intrusion barrier portions 20 can be arbitrarily changed as long as it is within a region of side edge portions formed in a predetermined region from the left side end edge or the right side end edge of the base portion 11 toward inside of the base portion 11 (for example, a region within 20% or less of a width dimension of the base portion 11 from the left side end edge or the right side end edge of the base portion 11 toward inside).

Each of the right and left resin intrusion barrier portions 20 of Embodiment 1 is formed to be a substantially same shape as a resin intrusion barrier portion provided in the molded surface fastener of the Patent Document 1. Here, the resin intrusion barrier portion 20 of Embodiment 1 is briefly described.

Each of the right and left resin intrusion barrier portions 20 includes three vertical wall rows 21 disposed parallel to each other along a length direction, a connecting portion 23 connecting between divided vertical walls 22, as described later, of these vertical wall rows 21, reinforcement portion 24 integrally provided on an outer wall surface side of the vertical wall row 21 disposed outside in a width direction. The resin intrusion barrier portion 20 of Embodiment 1 includes, as a vertical wall row 21, a first vertical wall row 21a disposed inside and closest to the engaging elements 12, a second vertical wall row 21b disposed adjacent to an outside of the first vertical wall row 21a, and a third vertical wall row 21c disposed outside and farthest from the engaging elements 12, in a right and left direction.

The first vertical wall row 21a, the second vertical wall row 21b, and the third vertical wall row 21c respectively include a plurality of divided vertical wall portions 22 disposed intermittently at a predetermined attaching pitch along a length direction. In each of the vertical wall rows 21, a predetermined gap is provided between the two divided vertical wall portions 22 disposed adjacent in the length direction.

The divided vertical wall portions 22 in the first vertical wall row 21a to the third vertical wall row 21c are disposed to be shifted in the length direction with a half size of the attaching pitch between the first vertical wall row 21a and the second vertical wall row 21b, and between the second vertical wall row 21b and the third vertical wall row 21c. Therefore, the divided vertical wall portions 22 of the resin intrusion barrier portions 20 are disposed alternately between the adjacent vertical wall rows 21 in the width direction to be formed as a zig-zag pattern as a whole.

Each of the divided vertical wall portions 22 includes a pillar portion rising from the base portion 11 and a top end portion protruding from the pillar portion in a length direction and a width direction. A height dimension of each divided vertical wall portion 22 in a vertical direction from an upper surface of the base portion 11 to an upper surface of the top end portion is set to be as large as a maximum value of a height dimension of the engaging elements 12 from the upper surface of the base portion 11. A top surface of the top end portion in each of the divided vertical wall portions 22 is formed to be flat.

The connecting portion 23 of the resin intrusion barrier portion 20 connects a front end portion (or a rear end portion) of the divided vertical wall portion 22 in the first vertical wall row 21a or the third vertical wall row 21c to a rear end portion (or a front end portion) of the divided vertical wall portion 22 in the second vertical wall row 21b at the shortest distance. That is, each divided vertical wall portion 22 in each vertical wall row 21 is connected to two divided vertical wall portions 22 in an adjacent vertical wall row 21 via two connecting portions 23.

Since the resin intrusion barrier portion 20 of Embodiment 1 is formed in a shape as above, the molded surface fastener 1 can have proper flexibility. Therefore, the molded surface fastener 1 can be easily curved in a vertical direction. Further in the invention, a shape of the resin intrusion barrier portion 20 is not particularly limited, and can be arbitrarily changed. For example, the resin intrusion barrier portion 20 can be formed with other shapes as described in the Patent Document 2.

The hook-shaped engaging elements 12 in Embodiment 1 are disposed so as to stand in the length direction and the width direction at a predetermined attaching pitch in order to obtain a predetermined connecting force (engaging force) with a skin material to be covered on the cushion body. Especially in Embodiment 1, the engaging elements 12 are disposed in the length direction so as to be aligned in a row at a predetermined attaching pitch, and at the same time the vertical rows of the engaging elements 12 are placed to be five rows in the width direction.

Here, the vertical rows of the engaging elements 12 along the length direction are referred to as element rows 13. In this case, the element row 13 of the engaging element 12 disposed on the far left side is referred to as a first element row 13a, the respective element rows 13 disposed on a right side of the first element row 13a are referred to as a second element row 13b, a third element row 13c, a fourth element row 13d, and a fifth element row 13e in an order from the left.

In a case of Embodiment 1, three rows which are the second element row 13b to the fourth element row 13d disposed in a center, out of the above-described five rows which are the first element row 13a to the fifth element row 13e, are formed within the magnetic region 18. Therefore, the entire engaging elements 12 contain the magnetic particles in these three which are the second element row 13b to the fourth element row 13d. Furthermore, the engaging elements 12 in the first element row 13a and the fifth element row 13e disposed on outer sides of right and left in the width direction contain substantially no magnetic particles.

Each of the engaging elements 12 of Embodiment 1 has a substantially same shape as the engaging elements described in the Patent Document 1. That is, the engaging element 12 in Embodiment 1 includes a rising portion rising vertically from the upper surface of the base portion 11 and a hook-shaped engaging head portion extending so as to curve toward a front and rear in the length direction at an upper end of the rising portion.

In this case, a maximum value of the height dimension of each of the engaging elements 12 from the base portion 11 is set to be as large as the height dimension of the divided vertical wall portion 22 from the base portion 11, as described above. Further in the invention, a shape and a dimension of each of the engaging elements 12 are not particularly limited, and can be arbitrarily changed. For example, the height dimension of the engaging element 12 from the base portion 11 can be set lower than the divided vertical wall portion 22 and the connecting portion 23 of the resin intrusion barrier portion 20.

In the invention, a region in which a plurality of engaging elements 12 is formed between the right and left resin intrusion barrier portions 20 is referred to as an engaging region 19. Further in the invention, an arrangement pattern of the engaging elements 12 is not particularly limited. For example, the plurality of engaging elements 12 may be disposed between the right and left resin intrusion barrier portions 20 with a predetermined arrangement pattern such as a zig-zag pattern as Embodiment 2, described later, and may be disposed randomly to form the engaging region 19.

The lateral wall portion 16 in Embodiment 1 is disposed along a width direction between the resin intrusion barrier portions 20 and the engaging element 12, and between the engaging elements 12 adjacent to each other in a right and left direction. In a case of Embodiment 1, the lateral wall portions 16 containing the magnetic particles and the lateral wall portions 16 containing substantially no magnetic particles are disposed to be divided by two rows which are the first element row 13a and the fifth element row 13e disposed outermost in the width direction as a boundary.

Specifically, since the lateral wall portions 16 disposed so as to be interposed between the first element row 13a and the fifth element row 13e are formed within the magnetic region 18, the entire lateral wall portions 16 contain the magnetic particles. On the other hand, the lateral wall portions 16 disposed outside of the first element row 13a and the fifth element row 13e in the width direction contain substantially no magnetic particles.

That is, in Embodiment 1, the boundary between the magnetic region 18 and the non-magnetic region containing substantially no magnetic particles is set at a position between the first element row 13a (or the fifth element row 13e) disposed outermost in the width direction and the lateral wall portion 16 disposed adjacent inside of the first element row 13a (or the fifth element row 13e) in a plan view of the molded surface fastener (FIG. 2).

In Embodiment 1, the lateral wall portions 16 disposed closest to the resin intrusion barrier portions 20 are connected with the engaging elements 12 adjacent inside of the lateral wall portions 16 in the width direction. Furthermore, the lateral wall portions 16 and the engaging elements 12 disposed adjacent each other in the width direction within the magnetic region 18 are connected to each other. On the other hand, the lateral wall portions 16 and the engaging elements 12 disposed adjacent to each other across the boundary of the magnetic region 18 are not connected, and are provided separately.

A height dimension of the lateral wall portion 16 from the base portion 11 is set be as large as height dimensions of the divided vertical wall portion 22 and the connecting portion 23 from the base portion 11. That is, in the molded surface fastener 1 of Embodiment 1, the height dimensions of the divided vertical wall portion 22, the connecting portion 23, the lateral wall portion 16, and the engaging element 12 are set to be the same size respectively, and the upper surface or the upper end of these are disposed on a same plane.

Therefore, the molded surface fastener 1 is attracted and fixed to a fastener holding portion 46a of the molding die 46 when foam molding of the cushion body as described later, thereby the divided vertical wall portion 22, the connecting portion 23, the lateral wall portion 16, and the engaging element 12 of the molded surface fastener 1 can be closely contacted to a cavity surface (fastener attaching surface) 47 of the fastener holding portion 46a in the molding die 46 stably. Therefore, a foam resin material can be prevented from penetrating into the engaging region 19 from the width direction beyond the right and left resin intrusion barrier portions 20 of the molded surface fastener 1. Furthermore, the foam resin material can be prevented from penetrating into the engaging region 19 from the length direction beyond the lateral wall portions 16 and the engaging elements 12.

The lateral wall portion 16 and the engaging element 12 disposed adjacent to each other so as to interpose the boundary of the magnetic region 18 are disposed separately with a small interval as described above. Even though the lateral wall portion 16 and the engaging element 12 are disposed separately in this way, the interval is extremely small. Therefore, the foam resin material of the cushion body cannot penetrate into the engaging region 19 from a gap between the lateral wall portion 16 and the engaging element 12.

The magnetic raised portions 14 of Embodiment 1 are formed upward from the base portion 11 so as to be raised. Each of the magnetic raised portions 14 is formed so as to be raised continuously in rib-like along a width direction within the magnetic region 18 of the molded surface fastener 1. Furthermore, in each of the element rows 13 of the second element row 13b to the fourth element row 13d, the magnetic raised portions 14 are disposed in an medial position between the adjacent engaging elements 12 each other in the length direction and between the hook-shaped engaging head portions of the engaging elements 12. In addition, the magnetic raised portions 14 are formed bisymmetrically about the center position between the right and left resin intrusion barrier portions 20. Such a magnetic raised portion 14 as a whole contains magnetic materials.

A width dimension of each of the magnetic raised portions 14 is set to be larger than that of between an outer side surface of the second element row 13b and an outer side surface of the fourth element row 13d, and smaller than that of the magnetic region 18. In the case of Embodiment 1, the width dimension of the magnetic raised portions 14 is set to be slightly smaller than that of the magnetic region 18.

In this case, the magnetic raised portion 14 has a shape whose cross section orthogonal to the width direction is a triangle or mountain shape so that a dimension of the magnetic raised portion 14 in the length direction gradually decreases upward. In this case, the upper end portion of the magnetic raised portion 14 is formed to be a curved surface so as to be chamfered. In addition, the cross section of the magnetic raised portion 14 orthogonal to the width direction has a same shape through the entire magnetic raised portion 14 in the width direction. A dimension of the lower end portion (base end portion) of the magnetic raised portion 14 in the length direction is set to be as large as an interval between the engaging head portions of the engaging elements 12 adjacent to each other in the length direction, or is set be smaller than the interval between the engaging head portions.

Furthermore, a height dimension H1 of the magnetic raised portion 14 from the base portion 11 is set to be 20% or more of a maximum height dimension H2 of the engaging element 12 from the base portion 11, preferably 30% or more, and particularly preferably ⅓ or more, as shown in FIG. 5. On the other hand, the height dimension H1 of the magnetic raised portion 14 is set to be smaller than a height dimension H3 of the engaging element 12 at a hook tip end 12a of the engaging head portions from the base portion 11, or set to be 60% or less of the maximum height dimension H2 of the engaging element 12 from the base portion 11. Especially, it is preferable that the height dimension H1 of the magnetic raised portion 14 is set to be ¾ or less of the height dimension H3 of the engaging element 12 at the hook tip end 12a from the base portion 11.

Since the magnetic raised portion 14 is formed with a shape and dimension as described above, a region higher than the upper surface of the base portion 11 in the molded surface fastener 1 can hold as many magnetic materials as possible. Especially in Embodiment 1, since the magnetic raised portion 14 is formed continuously in a rib-like along the width direction, more magnetic materials can be held effectively. In this case, the larger the height dimension H1 of the magnetic raised portion 14 becomes, the more magnetic materials can be held.

As a result, the molded surface fastener 1 can be attracted powerfully by the magnet 48 disposed on the molding die 46 when foam molding of the cushion body, as described later. Therefore, the molded surface fastener 1 can be magnetically attracted and fixed securely to a predetermined position of the molding die 46. Further in this case, an attaching position of the molded surface fastener 1 can be prevented from being shifted, and the molded surface fastener 1 can be prevented from disengaging with the molding die 46 effectively.

In the meantime, the magnetic raised portion 14 is disposed between the engaging elements 12 as described above. However, the magnetic raised portion 14 is formed lower than the hook tip end 12a of the engaging element 12, thereby the magnetic raised portion 14 hardly becomes an obstacle, for example when loops of female surface fastener is engaged with the hook-shaped engaging elements of Embodiment 1. On the contrary, the loops of female surface fastener in a free state introduced between the engaging elements 12 can be contacted with the magnetic raised portion 14.

As a result, the loops contacted with the magnetic raised portion 14 are distributed in a front and rear direction by the magnetic raised portions 14 having a triangular cross section and guided toward the engaging head portions of the engaging elements 12. Thus, more loops can be effectively engaged with each of the hook-shaped engaging elements 12 of the molded surface fastener 1. Therefore, the engaging strength of the molded surface fastener 1 with respect to the loops can be enhanced.

Fin piece portion 15 of Embodiment 1 is extended outward in a tongue shape from right and left side edges of the base portion 11. The fin piece portion 15 on the left side and the fin piece portion 15 on the right side are disposed alternately with a predetermined attaching pitch in the length direction. These right and left fin piece portions 15 are buried within the cushion body when the molded surface fastener 1 is integrated to the cushion body. Thereby, a fixing strength of the molded surface fastener 1 with respect to the cushion body can be enhanced.

Figure 7:
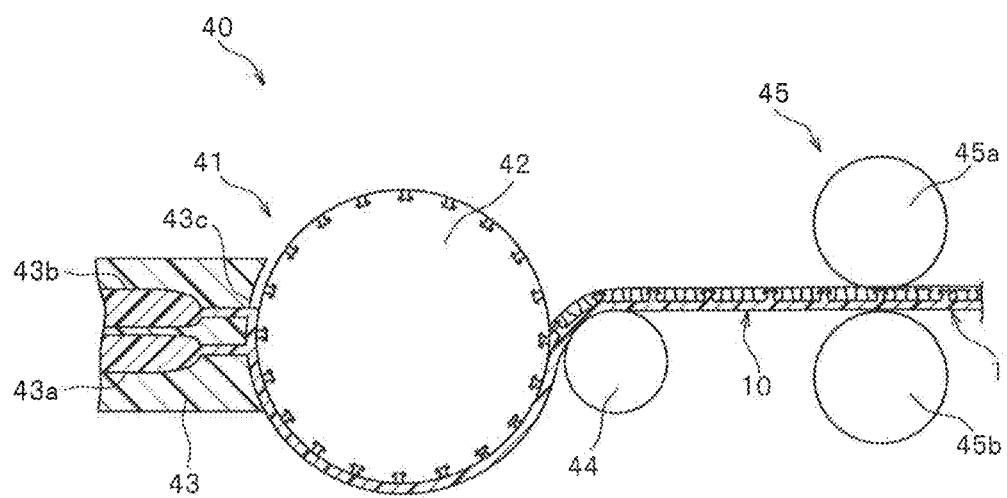
FIG. 7 is a schematic view expressing a manufacturing apparatus of the above molded surface fastener schematically.

The molded surface fastener 1 of Embodiment 1 as described above is manufactured by using a manufacturing apparatus 40 as shown in FIG. 7, for example.

The manufacturing apparatus 40 includes a molding apparatus 41 for a primary molding process and a heat pressure apparatus 45 for a second molding process in which a primary molded body 10 molded by the primary molding process is heated and pressurized.

The molding apparatus 41 of Embodiment 1 includes a die wheel 42 rotation-driving in one direction (anticlockwise direction in the drawing), an extrusion nozzle 43 disposed opposing to a peripheral surface of the die wheel 42 and continuously discharging a molten synthetic resin material, and a pickup roller 44 disposed on a downstream side of the extrusion nozzle 43 in a rotating direction of the die wheel 42.

On the peripheral surface of the die wheel 42 of the molding apparatus 41, a molding cavity for molding a primary divided vertical wall portion 32 and a connecting portion 23 in the primary molded body 10 as described later, and a molding cavity for molding the above described engaging element 12, lateral wall portion 16, and magnetic raised portion 14 are formed, respectively.

An interval between the extrusion nozzle 43 and the die wheel 42 is adjusted corresponding to a thickness of the base portion 11 to be molded. The die wheel 42 circulates cooling liquid therein in order to cool the primary molded body 10 to be molded on the peripheral surface of the die wheel 42. Furthermore, a cooling bath, not illustrated, is disposed on a lower part of the die wheel 42 in order to immerse a lower half portion of the die wheel 42.

In the extrusion nozzle 43, a first flow path 43a circulating only a molten synthetic resin material containing substantially no magnetic particles and a second flow path 43b circulating a molten synthetic resin material containing the magnetic particles are formed. Furthermore, in an extruding surface 43c of the extrusion nozzle 43, a plurality of first extrusion openings communicating with the first flow path 43a and discharging only the molten synthetic resin material, and a plurality of second extrusion openings communicating with the second flow path 43b and discharging the molten synthetic resin material in which the magnetic particles are kneaded.

The heat pressure apparatus 45 of Embodiment 1 includes upper and lower pair of an upper side pressure roller (calender roller) 45a and a lower side pressure roller (calender roller) 45b disposed on a downstream side of the pickup roller 44. A heat source, not illustrated, is provided within the upper side pressure roller 45a. An interval between the upper side pressure roller 45a and the lower side pressure roller 45b can be adjusted by a means of height adjustment, not illustrated, and is adjusted corresponding to a height of the vertical wall portion of the molded surface fastener 1.

In the invention, an upper side belt mechanism and/or a lower side belt mechanism, not illustrated, can be used instead of the upper pressure roller 45a and/or the lower side pressure roller 45b. In this case, each of the upper side and the lower side belt mechanisms includes an endless belt and a pair of right and left rollers to which the endless belt is wound and which rotates the endless belt in one direction.

When manufacturing the molded surface fastener 1 using the manufacturing apparatus 40 having the molding apparatus 41 and the heat pressure apparatus 45 as described above, a primary molding process to mold a primary molded body 10 by the molding apparatus 41 is conducted at first.

Figure 8:
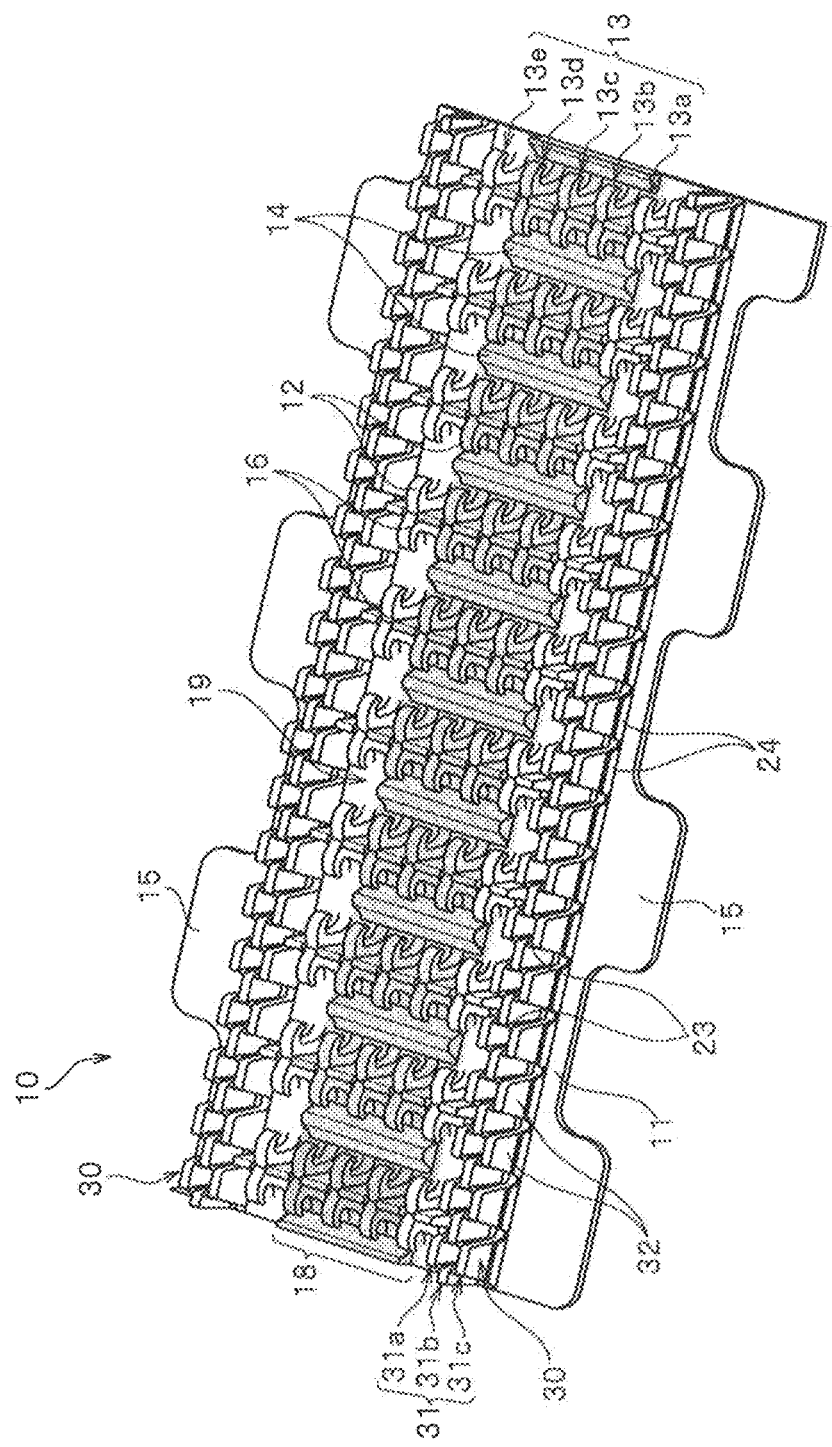
FIG. 8 is a perspective view illustrating a primary molded body molded by a primary molding process in the above manufacturing apparatus.
Figure 9:
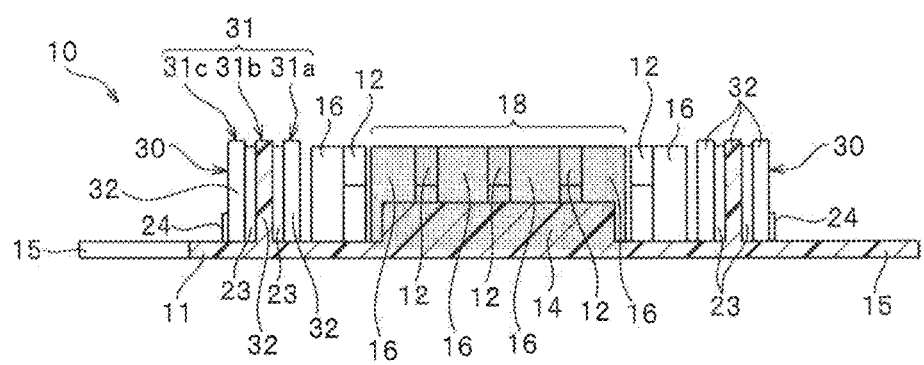
FIG. 9 is a cross-sectional view of the above primary molded body.

During the primary molding process, a synthetic resin material containing substantially no magnetic particles is continuously extruded toward the peripheral surface of the die wheel 42 at a predetermined extrusion amount from the first extrusion openings of the extrusion nozzle 43. At the same time, a synthetic resin material in which magnetic particles are kneaded at a predetermined ratio is continuously extruded toward the peripheral surface of the die wheel 42 at a predetermined extrusion amount from the second extrusion openings of the extrusion nozzle 43. Thereby, since the die wheel 42 is rotated in one direction, the long primary molded body 10, as shown in FIG. 8 and FIG. 9, is molded continuously on the peripheral surface of the die wheel 42 according to a rotation of the die wheel 42.

Here, the primary molded body 10 (also referred to as a preforming body) molded by the molding apparatus 41 of Embodiment 1 includes a thin plate-shaped base portion 11, right and left primary resin intrusion barrier portions 30 standing on right and left side edge portions of the base portion 11, engaging elements 12, lateral wall portions 16 and magnetic raised portions 14. A magnetic region 18 is formed in a central part in a width direction of the primary molded body 10.

In this case, the base portion 11, the engaging element 12, the lateral wall portion 16, and the magnetic raised portion 14 in the primary molded body 10 become the base portion 11, the engaging element 12, the lateral wall portion 16 and the magnetic raised portion 14 of the molded surface fastener 1 as they are. Furthermore, right and left primary resin intrusion barrier portions 30 are press molded during a second molding process, described later, and are formed to be right and left resin intrusion barrier portions 20 of the molded surface fastener 1. The primary resin intrusion barrier portions 30 of Embodiment 1 include three rows of a primary vertical wall row 31 (that is, a primary first vertical wall row 31a, a primary second vertical wall row 31b and a primary third vertical wall row 31c) having a plurality of primary divided vertical wall portions 32 in a length direction, a connecting portion 23 connecting between the primary divided vertical wall portions 32 adjacent in a right and left direction and a reinforcement portion 24 provided on the primary third vertical wall row 31c, respectively.

Such a primary molded body 10 is molded continuously such that two kinds of molten synthetic resin materials are extruded to the peripheral surface of the die wheel 42 from the extrusion nozzle 43 of the molding apparatus 41. At this moment, in the magnetic region 18 formed on the primary molded body 10, the synthetic resin material containing magnetic particles and extruded from the second extrusion openings of the extrusion nozzle 43 is poured in molding cavities of the engaging elements 12 and molding cavities of the magnetic raised portions 14 formed on the die wheel in a sequence according to a rotation of the die wheel 42.

Therefore, in Embodiment 1, even if the synthetic resin material containing the magnetic particles is extruded from the extrusion nozzle 43 at a predetermined flow amount, the synthetic resin material including the magnetic particles is poured in the molding cavities of the magnetic raised portions 14 and accommodated therein, when molding between two engaging elements 12 formed adjacently in a length direction.

Therefore, it can be effectively prevented that the extruded synthetic resin material containing the magnetic particles overflows from the molding cavities and flows around the lower surface side of the base portion 11. As a result, the lower surface portion of the base portion 11 can be molded with the synthetic resin containing substantially no magnetic particles. It should be noted that in this case, when a region between the engaging elements 12 and the magnetic raised portions 14 in the primary molded body 10 is molded, for example, although the synthetic resin material containing the magnetic particles is not exposed to the lower surface of the base portion 11, it may form a region slightly deeper from the upper surface of the base portion 11 compared to a region in which the engaging elements 12 and the magnetic raised portions 14 are provided.

The two kinds of the synthetic resin materials extruded from the extrusion nozzle 43 as described above are cooled down and cured by being half-rotated while being carried on an outer peripheral surface of the die wheel 42. Afterwards, the primary molded body 10 cooled down on the outer peripheral surface of the die wheel 42 is peeled off continuously from the die wheel by the pickup roller.

The primary molded body 10 peeled off from the die wheel 42 is conveyed toward the heat pressure apparatus 45 conducting the second molding process, and introduced between the upper side pressure roller 45a and the lower side pressure roller 45b of the heat pressure apparatus 45. During the second molding process, an upper end portion of the primary divided vertical wall portion 32 in the primary molded body 10 is heated and pressurized by the upper side pressure roller when the primary molded body 10 passes between the upper side pressure roller 45a and the lower side pressure roller 45b.

Thereby, the upper end portion of the primary divided vertical wall portion 32 is pressed so as to extend in a length direction and a width direction. As a result, the upper end portion of the primary divided vertical wall portion 32 is thermal deformed and expanded toward front and rear and right and left directions. At the same time, a height dimension of the primary divided vertical wall portion 32 is adjusted to a height dimension of the engaging elements 12 and the lateral wall portions 16.

Thus, the molded surface fastener 1 of Embodiment 1 as shown in FIG. 1 and the like is manufactured. Thereafter the manufactured molded surface fastener 1 is, for example, conveyed toward a cutting portion, not illustrated, cut at the cutting portion at a predetermined length and collected, or wound around on a recovery roller and the like in a rolled shape and collected in a state of being long.

Further in Embodiment 1, signs such as a product number can be put on with black color by printing on a lower surface of the base portion 11 in the molded surface fastener 1, after or before collecting of the molded surface fastener 1. In this case, the magnetic particles are not exposed to the lower surface of the base portion 11 in the molded surface fastener 1 of Embodiment 1 as mentioned above, and a desired color (e.g. green) by pigments mixed in the synthetic resin is stably expressed on the entire lower surface of the base portion 11. Therefore, in Embodiment 1, it does not occur that the printing of such as a product number hardly becomes to be seen due to the magnetic particles exposed to be black, and can be put clearly visible on the lower surface of the base portion 11.

In the invention, an apparatus or a process for manufacturing the molded surface fastener 1 is not particularly limited, and can be arbitrarily changed. In the Embodiment, for example, the primary molded body 10 is molded by continuously extruding the molten synthetic resin materials and the like toward the peripheral surface of one die wheel 42 from the extrusion nozzle 43. However, in the invention, the primary molded body 10 can also be molded by continuously extruding the molten synthetic resin materials and the like between a pair of upper and lower molding rollers from the extrusion nozzle using the pair of upper and lower molding rollers on which molding cavities similar to those of the die wheel 42 as described above are formed on at least one peripheral surface.

Figure 10:
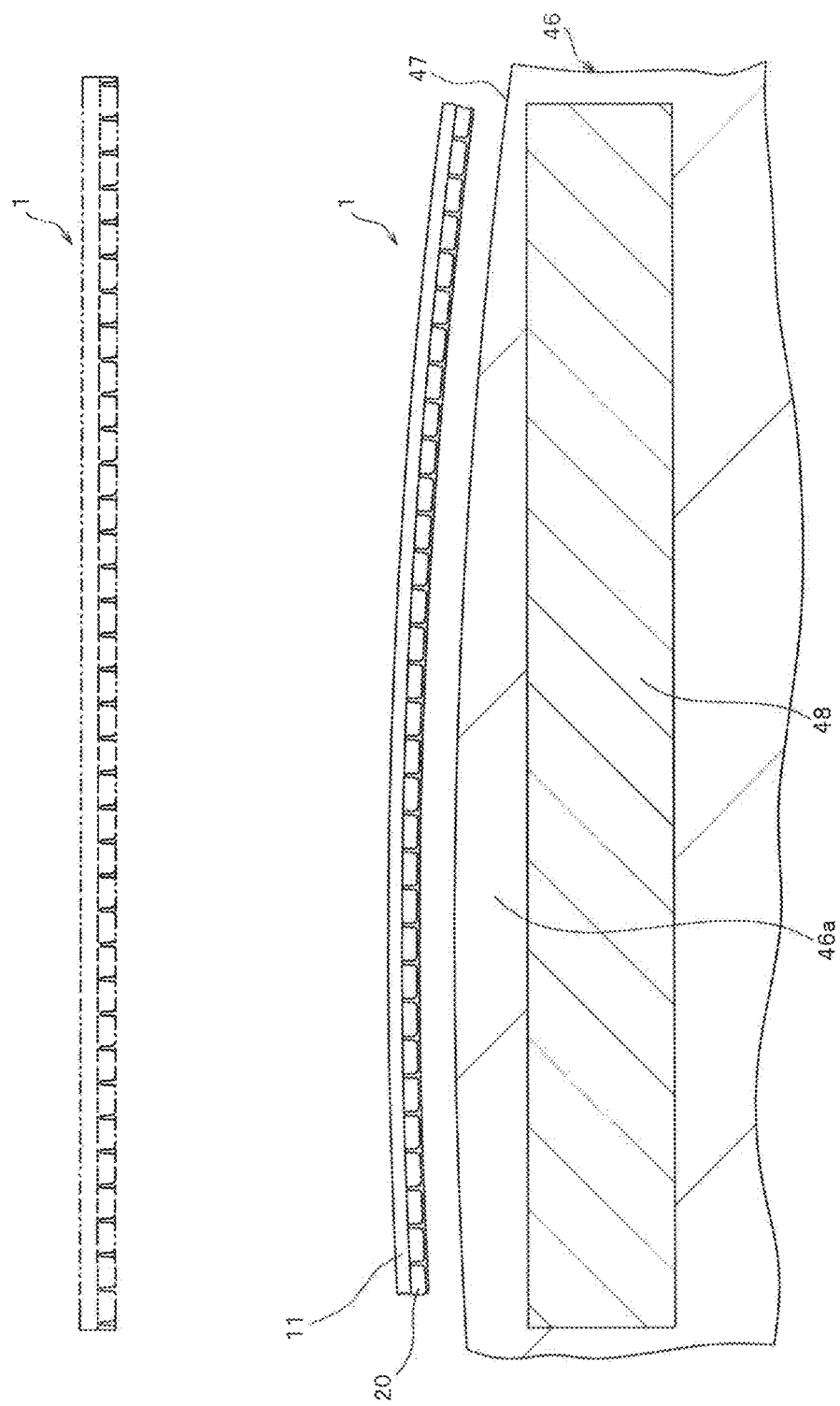
FIG. 10 is an explanatory view explaining a state that the molded surface fastener is closely contacted with a curved fastener attaching portion of the molding die for molding a cushion body.

The molded surface fastener 1 of Embodiment 1 manufactured as above, for example, is suitably used for a cushion body (foam body) such as a seat for an automobile, not illustrated. In this case, the molded surface fastener 1 is integrated such that the plurality of engaging elements 12 is exposed to a front surface of the cushion body when foam molding of the cushion body, as shown in FIG. 10.

When manufacturing such a cushion body, the long molded surface fastener 1 is cut at a desired length at first, and the cut molded surface fastener 1 is placed on a cavity surface (fastener attaching surface) 47 of a fastener holding portion 46a provided on the molding die 46 of the cushion body.

At this time, a magnet 48 is disposed corresponding to a position of the molded surface fastener 1 to be placed inside the fastener holding part 46a of the molding die 46. Therefore, when the molded surface fastener 1 is placed such that the engaging elements 12 oppose to the cavity surface 47 of the molding die 46, the molded surface fastener 1 is magnetically attracted and fixed on the cavity surface 47 of the molding die 46.

Especially in the molded surface fastener 1 of Embodiment 1, since the magnetic region 18 is formed within a predetermined region in the central part in the width direction of the molded surface fastener 1, the magnetic particles are dispersed intensively in the central part in the width direction. Furthermore, the magnetic particles are contained not only in the engaging elements 12 and the lateral wall portions 16 provided within the magnetic region 18, but also in the magnetic raised portions 14.

That is, in Embodiment 1, many magnetic particles are efficiently held in the central part in the width direction of the molded surface fastener 1, and at the same time the portion apart from the base portion 11 and close to the magnet 48 (magnet vicinity portion).

Therefore, when the molded surface fastener 1 is attached to the molding die 46, the molded surface fastener 1 can be fixed firmly to the fastener attaching surface 47 of the molding die 46 such that a position and direction of the molded surface fastener 1 is automatically adjusted accurately corresponding to the position and direction of the magnet 48.

Further in this case, the magnetic particles are not exposed to the lower surface of the base portion 11. Therefore, when the molded surface fastener 1 is attached to the molding die 46, a lower surface side of the molded surface fastener 1 is not attracted to the magnet 48 of the molding die 46 stronger than an upper surface side on which magnetic particles are exposed. As a result, it can be effectively prevented that the molded surface fastener 1 is attached to the molding die 46 with the direction upside down.

Furthermore, in the molded surface fastener 1 of Embodiment 1, the magnetic particles are not exposed to the lower surface of the base portion 11, as described above. Therefore, appearances of the front surface and the rear surface of the molded surface fastener 1 can be clearly identified by differentiating a color shown on a front surface side and a color shown on a rear surface side of the molded surface fastener 1. Thereby, when the molded surface fastener 1 is fixed to the molding die 46 by using a magnetic force, the operator can confirm instantly and surely if the molded surface fastener 1 is fixed in a vertically right direction or in an opposite direction.

Therefore, according to the molded surface fastener 1 of Embodiment 1, an installation operation of the molded surface fastener 1 with respect to the molding die 46 can be conducted accurately in short time and effectively, as described above. Thus, work efficiency can be improved, and working hours can be shortened.

In the molded surface fastener 1 of Embodiment 1, since the resin intrusion barrier portion 20 has a shape as above, the molded surface fastener 1 can be easily curved in a vertical direction. Therefore, even if the cavity surface 47 in the fastener holding portion 46a of the molding die 46 is formed in a convex shape or a concave shape as shown in FIG. 10, the molded surface fastener 1 can be closely contacted and fixed to the cavity surface 47 of the molding die 46.

Figure 11:
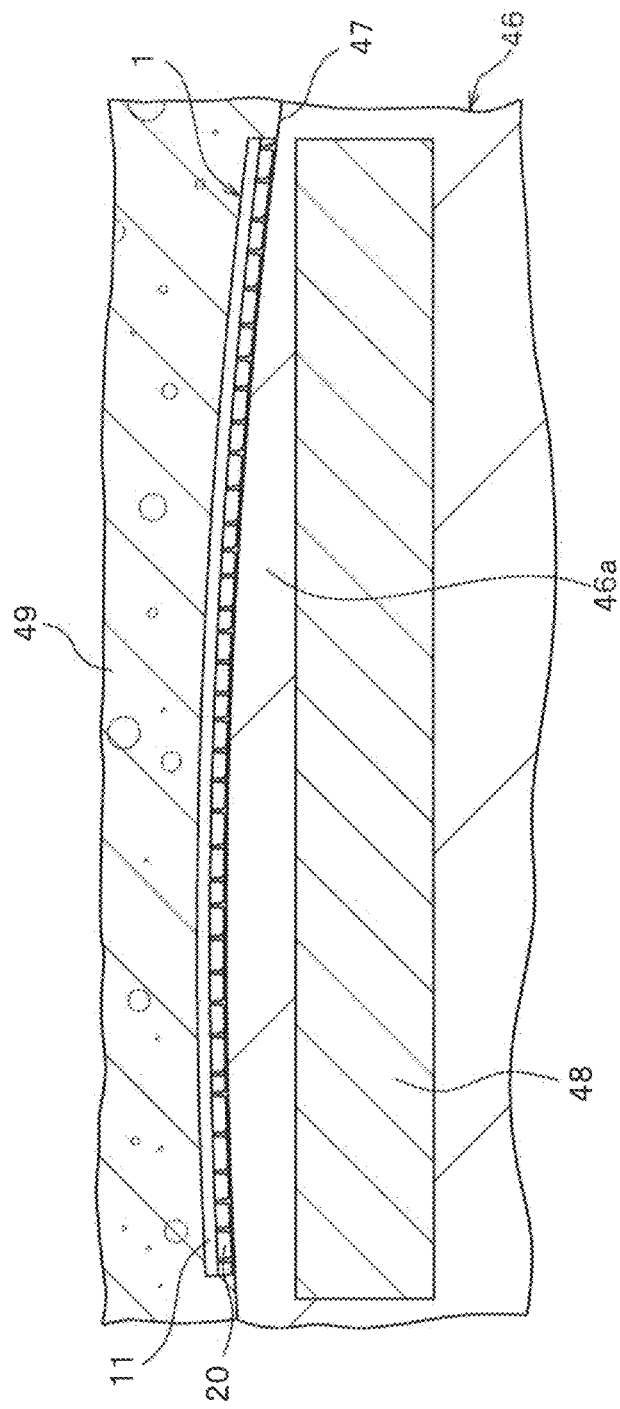
FIG. 11 is an explanatory view explaining a state a cushion body is foam molded within the molding die.

Afterwards, a foam resin material of the cushion body is injected into a cavity space of the molding die 46. Thereby, the cushion body (foam body) 49 is foam molded as shown in FIG. 11 such that the foam resin material foams and flows into the lower surface side of the base portion 11 of the molded surface fastener 1, outer sides of the right and left resin intrusion barrier portions 20, and into front and rear end edges of the molded surface fastener 1 to extend throughout the cavity space of the molding die 46.

At this point, in the molded surface fastener 1 of Embodiment 1, the right and left resin intrusion barrier portions 20, the engaging elements 12, and the lateral wall portions 16 can respectively prevent the foam resin material of the cushion body 49 from intruding into the engaging region 19 from the width direction and the length direction of the molded surface fastener 1. Therefore, the engaging elements 12 within the engaging region 19 can be prevented from being buried by the foam resin of the cushion body 49.

Thus, after the foam molding is finished by the foam resin material being foamed and cured, the cushion body in which the molded surface fastener 1 is integrally fixed to a front surface of a predetermined portion is manufactured. In the cushion body obtained in this way, the plurality of engaging elements 12 is disposed within the engaging region 19 of the molded surface fastener 1 at an appropriate density. Furthermore, the engaging region 19 is not intruded by the cushion body. Therefore, the molded surface fastener 1 integrated to the cushion body can stably ensure a desired engaging force with respect to the female surface fastener.

Furthermore in Embodiment 1, the magnetic raised portion 14 is provided between the engaging elements 12 adjacent in the length direction within the magnetic region 18 with the above mentioned shape and dimension. Therefore, when a loop of the female surface fastener is engaged with the molded surface fastener 1, the loop inserted between the engaging elements 12 from above is contacted with a front surface of the magnetic raised portion 14, thereby a tip end portion of the loop can be introduced toward under the engaging head portions of the engaging elements 12 disposed on the front and rear of the magnetic raised portions 14.

As a result, the loop can be easily engaged (easily caught) with the engaging element 12 of the molded surface fastener 1. Furthermore, since a number of the loops engaging with each of the engaging elements 12 can be increased, an improvement of the engaging strength (disengaging strength) of the loops in the molded surface fastener 1 can be expected.

Therefore, the front surface of the manufactured cushion body is covered with the skin material, thereby the plurality of loops provided on a rear surface of the skin material can be engaged easily and firmly with the hook-shaped engaging elements 12 of the molded surface fastener 1. Therefore, the skin material can be closely contacted along a curved surface of the cushion body and accurately attached without floating up from the cushion body.

In the invention, a configuration of the magnetic raised portion 14 provided on the molded surface fastener 1 is not limited to Embodiment 1, as described above. As long as the magnetic raised portion in the invention can be provided between the engaging elements 12 adjacent in the length direction within the magnetic region 18, the shape can be arbitrarily changed, for example as shown in FIG. 12 to FIG. 14.

Figure 12:
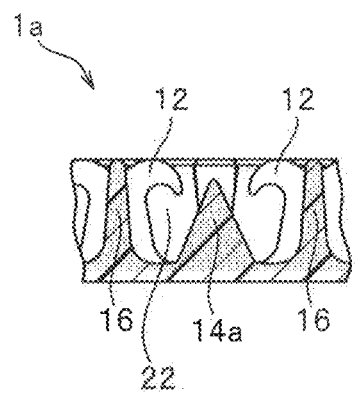
FIG. 12 is a main part cross-sectional view illustrating a molded surface fastener according to a modification example of Embodiment 1.
Figure 13:
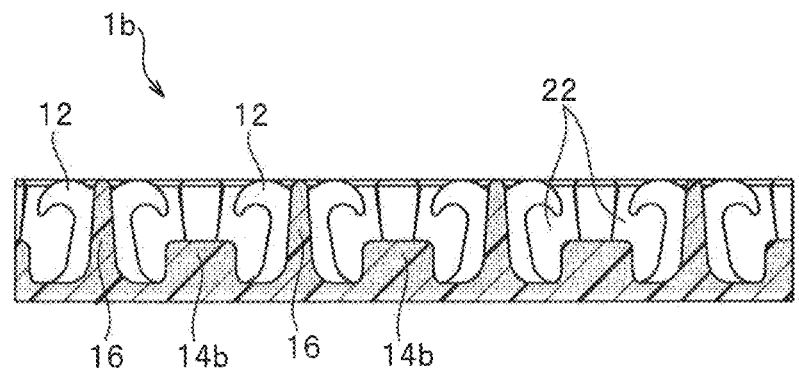
FIG. 13 is a main part cross-sectional view illustrating a molded surface fastener according to another modification example of Embodiment 1.
Figure 14:
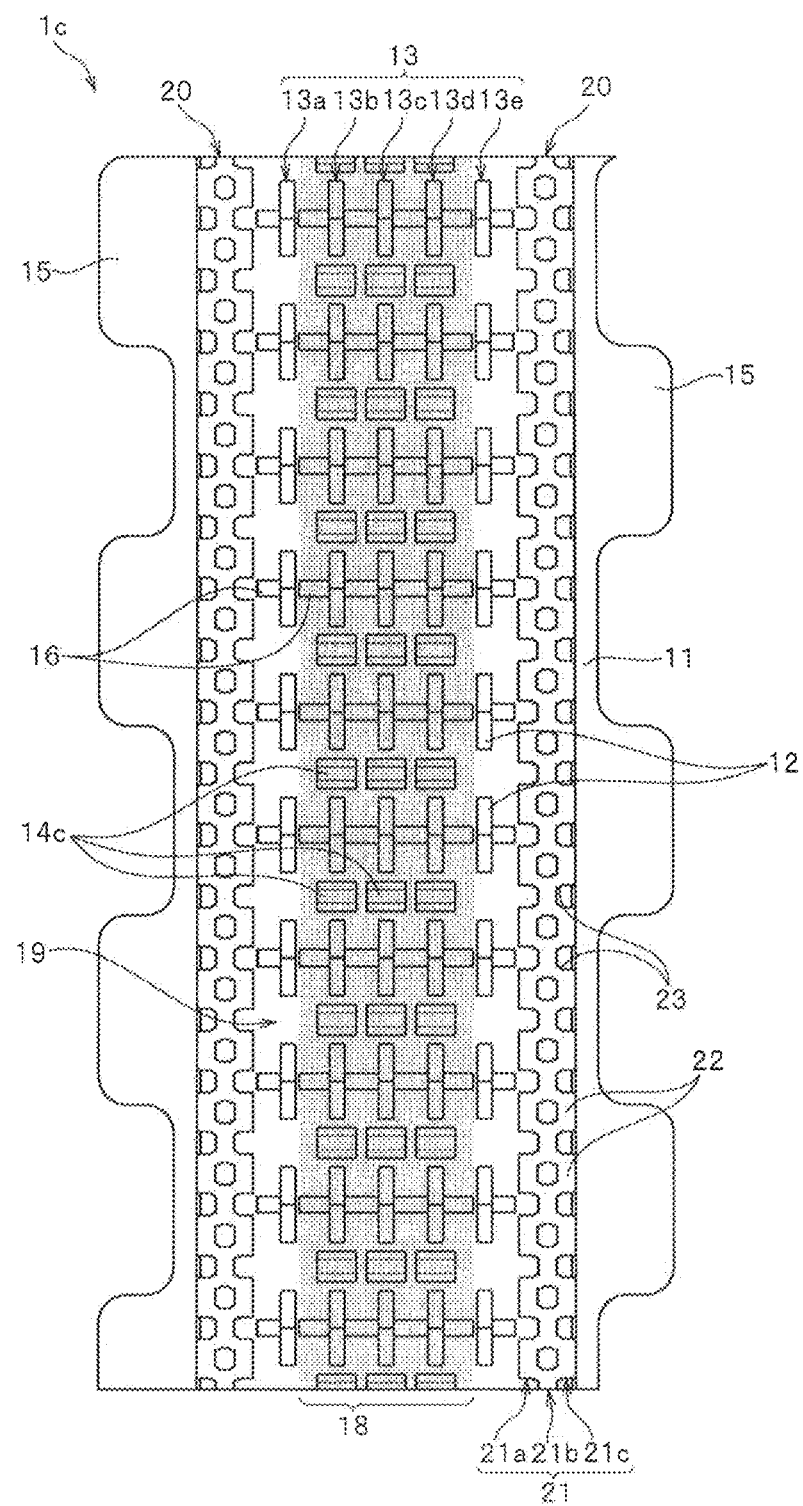
FIG. 14 is a plan view illustrating a molded surface fastener according to yet another modification example of Embodiment 1.

Molded surface fasteners 1a, 1b, 1c as modification Examples 1 to 3 are shown in FIG. 12 to FIG. 14, as a molded surface fastener according to a modification example of Embodiment 1. These three molded surface fasteners 1a, 1b, 1c, except for magnetic raised portions 14a, 14b, 14c, as described later, are substantially same as the molded surface fastener 1 of Embodiment 1. Therefore, the detailed explanation is not described but represented with the same reference signs as Embodiment 1 in the modification examples 1 to 3.

In the molded surface fastener 1a according to the modification example 1 shown in FIG. 12, for example, each of the magnetic raised portions 14a has a shape in which a cross section orthogonal to a width direction is triangle, and is formed to be more angulate than the magnetic raised portions 14 of Embodiment 1. Furthermore, the magnetic raised portion 14a of the modification example 1 is formed to be higher than a height position of a hook tip end of the engaging element 12, and lower than a height position of an upper end of the engaging element 12.

Since such a magnetic raised portion 14a is provided in the modification example 1, more magnetic particles than a case of Embodiment 1 can be held at the magnet vicinity portion apart from the base portion 11 of the molded surface fastener 1a. Therefore, the molded surface fastener 1a of the modification example 1 can be magnetically attracted and more firmly fixed to the fastener holding part 46a in which the magnet 48 of the molding die 46 is disposed.

Furthermore, since the magnetic raised portion 14a of the modification example 1 has a triangle cross section as described above, when a loop of the female surface fastener is engaged with the molded surface fastener 1a, the magnetic raised portion 14a can be hardly an obstacle for the loop inserted from above between the engaging elements 12 during the loop being inserted toward the engaging elements 12 disposed on front and rear of the magnetic raised portion 14a.

Next, in the molded surface fastener 1b according to the modification example 2 as shown in FIG. 13, each of the magnetic raised portions 14b has a shape in which a cross section orthogonal to a width direction is rectangular. In the modification example 2, a dimension of the magnetic raised portion 14b in a length direction is set to be as large as an interval between the engaging head portions of the engaging elements 12 adjacent each other in a length direction or smaller than the interval of the engaging head portions. The magnetic raised portion 14b may be formed to have a shape in which a cross section orthogonal to a width direction is trapezoidal.

Furthermore, a height dimension of the magnetic raised portion 14b from the base portion 11 is set to be 20% or more of a maximum height dimension of the engaging element 12 from the base portion, preferably 30% or more, and more preferably ⅓ or more. On the other hand, a height dimension of the magnetic raised portion 14b is set to be smaller than a height dimension of a hook tip end 12a of an engaging head portion in the engaging element 12 from the base portion 11, or is set to be 60% or less of a maximum height dimension of the engaging element 12 from the base portion 11. Especially, it is preferable that the height dimension of the magnetic raised portion 14b is set to be ¾ or less of the height dimension of the hook tip end 12a.

Since such a magnetic raised portion 14b is provided in the modification example 2, more magnetic particles than a case of Embodiment 1 can be held efficiently at the magnet vicinity portion apart from the base portion 11 of the molded surface fastener 1b.

Next, in the molded surface fastener 1c according to the modification example 3 as shown in FIG. 14, the magnetic raised portions 14c are disposed along a width direction intermittently at a predetermined interval. For example, the magnetic raised portion 14 of Embodiment 1 is formed continuously in a width direction through the second element row 13b, the third element row 13c, and the fourth element row 13d at a position interposed by the adjacent engaging elements 12 in the length direction, as shown in FIG. 2.

In contrast, the magnetic raised portion 14c of the modification example 3 is formed on a position interposed by the engaging elements 12 adjacent in the length direction of the second element row 13b, the third element row 13c, and the fourth element row 13d, while is divided into three in the width direction. In this case, regarding a width direction, the magnetic raised portions 14c are disposed at each of positions corresponding to the second element row 13b, the third element row 13c, and the fourth element row 13d, respectively.

Since such magnetic raised portions 14c are provided in the modification example 3, more magnetic particles can be held at the magnet vicinity portion apart from the base portion 11 of the molded surface fastener 1c. Same as a case of Embodiment 1, loops inserted between the engaging elements 12 from above can be distributed to the engaging elements 12 disposed on a front and a rear of the magnetic raised portions 14c, and can be easily caught with the engaging elements 12. In addition, since the magnetic raised portions 14c are formed to be divided in the width direction, flexibility (especially flexibility in the width direction) of the molded surface fastener 1c can be improved higher than the molded surface fastener 1 of Embodiment 1.

Embodiment 2

Figure 15:
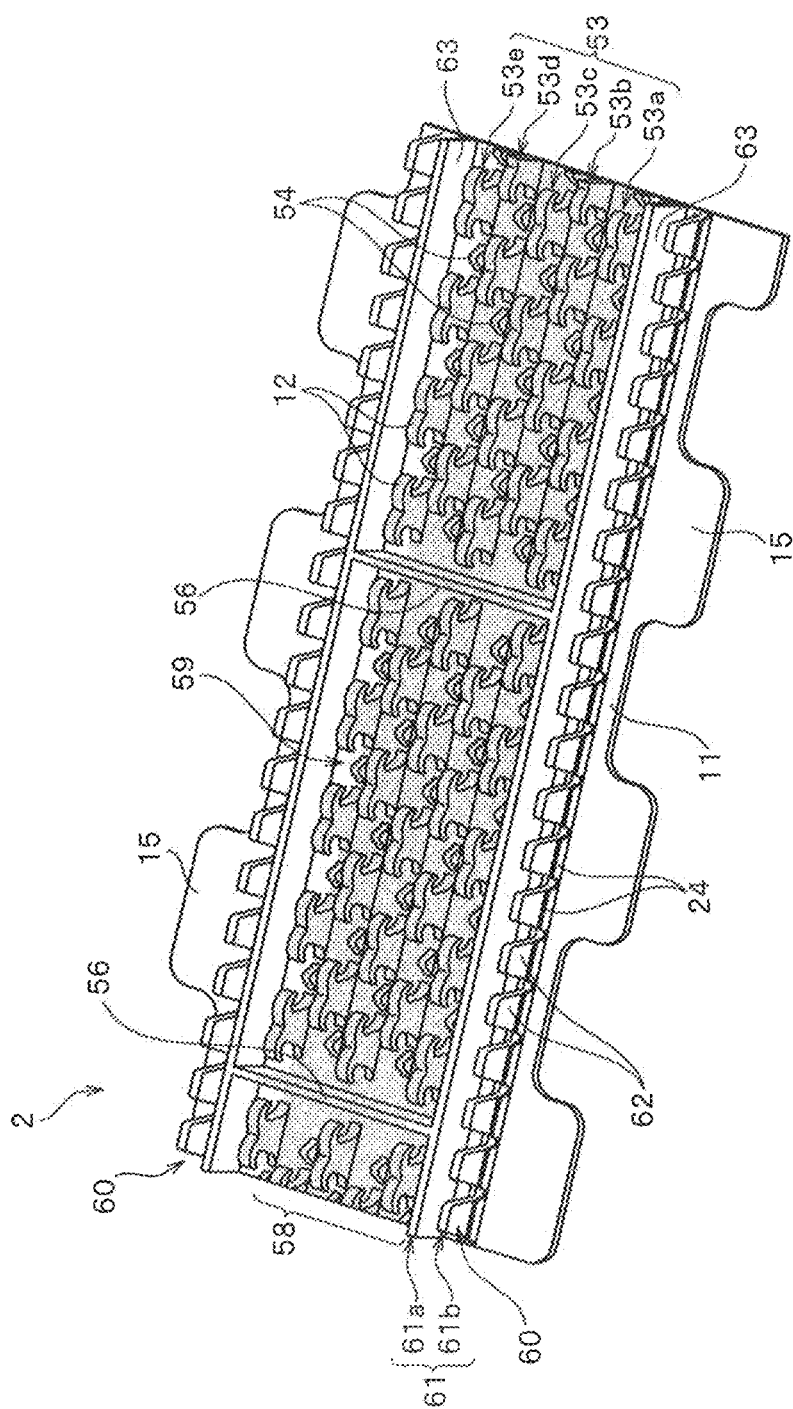
FIG. 15 is a perspective view illustrating a molded surface fastener according to Embodiment 2 of the invention.
Figure 16:
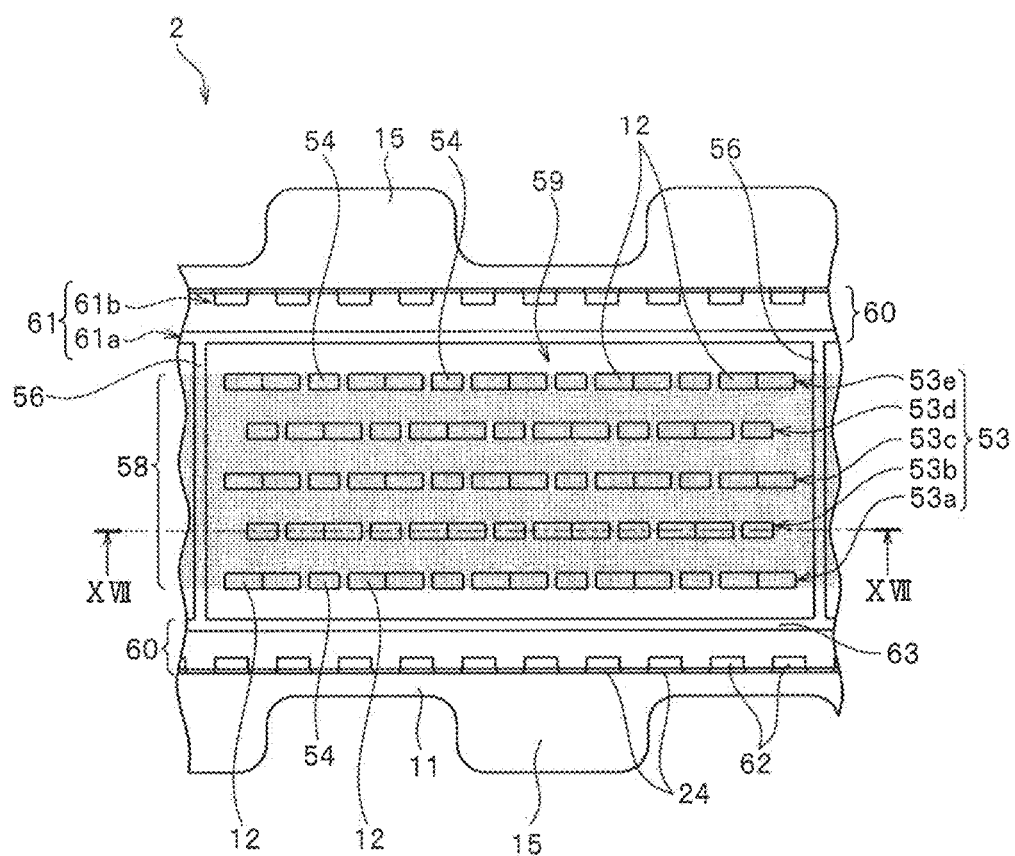
FIG. 16 is a plan view of the above molded surface fastener.
Figure 17:
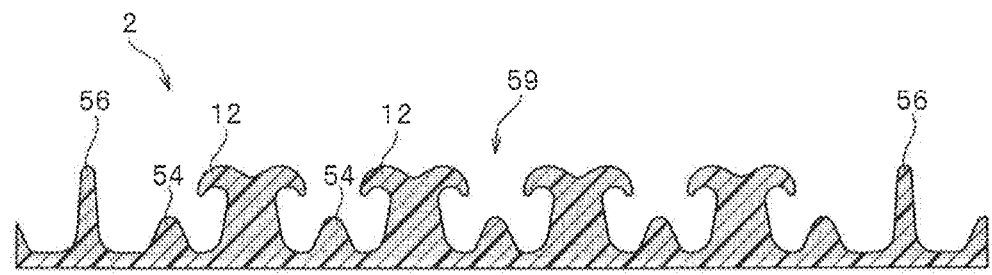
FIG. 17 is a cross-sectional view in XVII-XVII line shown in FIG. 16.

FIG. 15 is a perspective view illustrating a molded surface fastener according to Embodiment 2, and FIG. 16 is a plan view of the above molded surface fastener. FIG. 17 is a cross-sectional view of the above molded surface fastener.

The molded surface fastener 2 according to Embodiment 2 includes a flat plate-shaped base portion 11 longwise in a front and rear direction, resin intrusion barrier portions 60 standing on right and left side edge portions of the base portion 11, a plurality of hook-shaped engaging elements 12 disposed between the right and left resin intrusion barrier portions 60, lateral wall portions 56 disposed along a width direction between the right and left resin intrusion barrier portions 60, magnetic raised portions 54 disposed along a width direction between the engaging elements 12 adjacent in a length direction, and fin piece portions 15 extending outward in a width direction from right and left side edges of the base portion 11.

It should be noted that, in the molded surface fastener 2 of Embodiment 2 and a molded surface fastener 2a of a modification example 4, as described later, the detailed explanation for a portion or member having substantially the same configuration as the above described molded surface fastener 1 of Embodiment 1 is not described but represented with the same reference signs as above described Embodiment 1.

In the molded surface fastener 2 of Embodiment 2, a magnetic region 58 formed of a synthetic resin containing magnetic particles is formed along a length direction in a central region of the base portion 11 in a width direction at a predetermined width dimension. In this magnetic region 58, the magnetic particles are contained in at least a part of an upper surface portion of the base portion 11, entire engaging elements 12, and entire magnetic raised portions 54. Portions except for the magnetic region 58 of the molded surface fastener 2 are formed of a synthetic resin containing substantially no magnetic particles.

The resin intrusion barrier portion 60 of Embodiment 2 includes, as a vertical wall row 61, a first vertical wall row 61a formed along a length direction on an inner side and a second vertical wall row 61b formed along a length direction on an outer side. It should be noted that the connecting portion 23 of Embodiment 1 connecting between the first vertical wall row 61a and the second vertical wall row 61b is not provided in the resin intrusion barrier portion 60 of Embodiment 2.

The first vertical wall row 61a on the inner side is continuously and seamlessly disposed along the length direction, and is formed to be a single continuous vertical wall portion 63 standing with a predetermined height dimension from the base portion 11. The second vertical wall row 61b on the outer side is disposed in a line along the length direction, and is formed to be a plurality of divided vertical wall portions 62 disposed intermittently at a predetermined attaching pitch. In this case, the height dimension of the continuous vertical wall portion 63 from the base portion 11 and the height dimension of each of the divided vertical wall portions 62 from the base portion 11 are set to be a same size each other. Furthermore, a reinforcement portion 24 is integrally formed on outer wall surfaces of each of the divided vertical wall portions 62.

The engaging elements 12 of Embodiment 2 are regularly disposed in a zig-zag pattern within each of regions surrounded by the right and left resin intrusion barrier portions 60 and the two lateral wall portions 56 adjacent in the length direction. Therefore, each of the regions surrounded by these resin intrusion barrier portions 60 and the two lateral wall portions 56 forms an engaging region 59.

In this case, the engaging elements 12 are disposed in a line at a predetermined attaching pitch in the length direction. Thus, five element rows 53 which are a first element row 53a to a fifth element row 53e are formed. Furthermore, the engaging elements 12 are disposed alternately between the element rows 53 adjacent each other in a width direction. Furthermore, in Embodiment 2, all the element rows 53 of the first element row 53a to the fifth element row 53e are formed within the magnetic region 58. Therefore, all the engaging elements 12 entirely contain the magnetic particles.

In Embodiment 2, a boundary between the magnetic region 58 and a non-magnetic region containing substantially no magnetic particles is formed along a length direction at a position of outer wall surfaces of the engaging elements 12 in the first element row 53a and the fifth element row 53e disposed on the outermost side in a width direction. In Embodiment 2, the boundary between the magnetic region 58 and the non-magnetic region can be formed on an arbitrary position as long as it is within a region interposed by the right and left resin intrusion barrier portions 60.

Each of the engaging elements 12 itself of Embodiment 2 is formed with a same shape and size as the engaging element 12 of Embodiment 1 as described above. Furthermore, a maximum value of a height dimension of each of the engaging elements 12 from the base portion 11 is set to be as large as a height dimension of the continuous vertical wall portion 63 and the divided vertical wall portion 62 of the resin intrusion barrier portion 60 from the base portion 11.

The lateral wall portion 56 of Embodiment 2 is formed continuously and seamlessly along a width direction with a predetermined height dimension from the base portion 11, and is connected with the continuous vertical wall portions 63 of the right and left resin intrusion barrier portions 60. Furthermore, the lateral wall portion 56 is provided in a length direction at a predetermined interval (attaching pitch).

In this case, a height dimension of the lateral wall portion 56 from the base portion 11 is set to be as large as the height dimensions of the continuous vertical wall portion 63 and the divided vertical wall portions 62 from the base portion 11. Furthermore, a part of the region in each of the lateral wall portions 56 is formed within the magnetic region 58, and the magnetic particles are contained in the entire part of the region.

The magnetic raised portion 54 of Embodiment 2 is formed to be raised upward from the base portion 11 such that the entire magnetic raised portion 54 contains the magnetic materials. Furthermore, the magnetic raised portion 54 has a same width dimension as the engaging element 12, and is formed along each of the element rows 53 of the engaging element 12. In this case, the magnetic raised portion 54 is disposed on a medial position of the engaging elements 12 adjacent each other in a length direction in each element row 53 of the first element row 53a to the fifth element row 53e.

A cross section of the magnetic raised portion 54 of Embodiment 2 orthogonal to a width direction has a triangle or mountain shape in which a dimension in a length direction of the magnetic raised portion 54 is gradually decreased upward. A dimension in a length direction of a base end portion (lower end portion) of the magnetic raised portion 54 is set to be as large as an interval between the engaging head portions of engaging elements 12 adjacent each other in the length direction, or smaller than the interval between the engaging head portions.

Furthermore, a height dimension of the magnetic raised portion 54 from the base portion 11 is 20% or more, preferably 30% or more, and particularly preferably ⅓ or more, of a maximum height dimension of the engaging element from the base portion 11. Owing to this, many magnetic materials can be held within a height region higher than an upper surface of the base portion 11 in the molded surface fastener 2. On the other hand, a height dimension of the magnetic raised portion 54 is set to be smaller than a height dimension of the hook tip end 12a of the engaging head portion in the engaging element 12 from the base portion 11, or set to be 60% or less of a maximum height dimension of the engaging element 12 from the base portion 11. In particular, it is preferable that the height dimension of the magnetic raised portion 54 is set to be ¾ or less of the height dimension of the hook tip end 12a.

The molded surface fastener 2 of Embodiment 2 as described above is manufactured almost similarly to a case of the molded surface fastener 1 of the above described Embodiment 1, for example, by using a manufacturing apparatus 40 as shown in FIG. 7. The molded surface fastener 2 of Embodiment 2 is suitably used for a cushion body such as a seat for an automobile, and is integrated to the cushion body same as in a case of the molded surface fastener 1 of above described Embodiment 1.

Since the magnetic raised portion 54 is provided between the engaging elements 12 adjacent in the length direction, the above described molded surface fastener 2 of Embodiment 2 can exhibit almost similar effect to the above described molded surface fastener 1 of Embodiment 1.

Specifically, when the molded surface fastener 2 is manufactured by a two color molding, it is possible to prevent or suppress that the synthetic resin containing the magnetic particles intrudes to a lower surface side of the base portion 11 because of a formation of the magnetic raised portion 54. Therefore, appearances on front and rear surfaces of the molded surface fastener 2 can be clearly identified.

In addition, since the magnetic raised portion 54 is provided on the molded surface fastener 2, when a cushion body is foam molded, the molded surface fastener 2 can be magnetically attracted to a fastener holding portion 46a of a molding die 46 strongly in a right position and direction, and fixed stably. Furthermore, at this time, since the appearances of the front and the rear surfaces of the molded surface fastener 2 are different, attaching operation of the molded surface fastener 2 with respect to the molding die 46 can be conducted accurately and efficiently.

In the cushion body in which the molded surface fastener 2 of Embodiment 2 is integrated, the engaging elements 12 are formed within the engaging region 59 of the molded surface fastener 2 at a proper density. The engaging region 59 is not intruded by the cushion body. Furthermore, each of the magnetic raised portions 54 provided between the engaging elements 12 can distribute loops inserted between the engaging elements 12 toward the front and rear engaging elements 12. Therefore, a high engaging force with respect to the loops of the female surface fastener can be stably obtained.

Furthermore, in addition to the above effect, the molded surface fastener 2 of Embodiment 2 has superior flexibility compared to the molded surface fastener 1 of above described Embodiment 1, since the engaging elements 12 and the magnetic raised portions 54 are placed in a zig-zag pattern.

Figure 18:
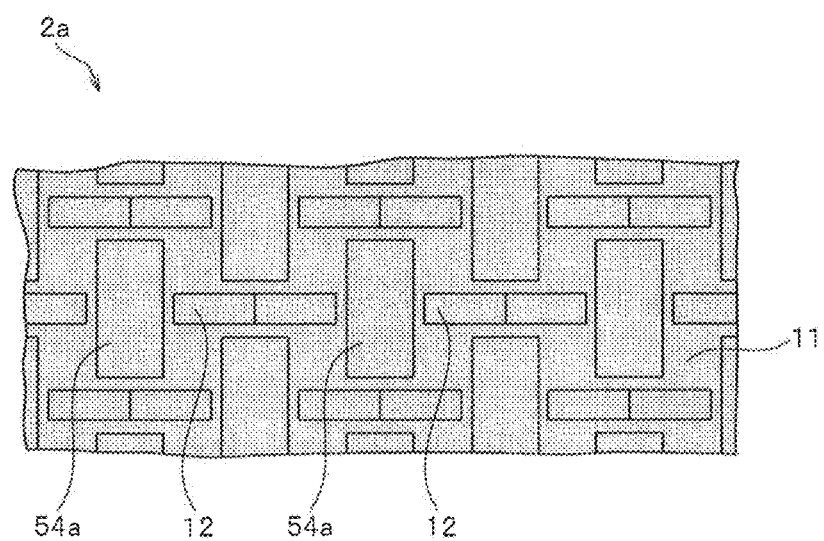
FIG. 18 is a plan view illustrating a molded surface fastener according to a modification example of Embodiment 2.
Figure 19:
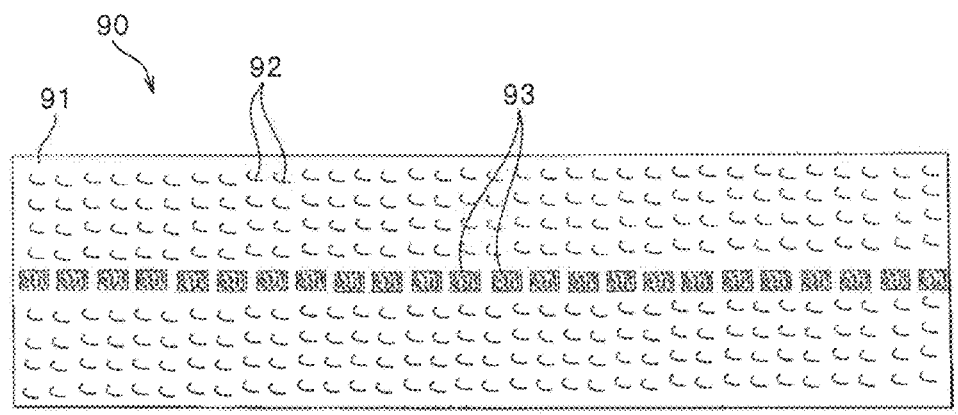
FIG. 19 is a plan view illustrating a conventional molded surface fastener.
Figure 20:
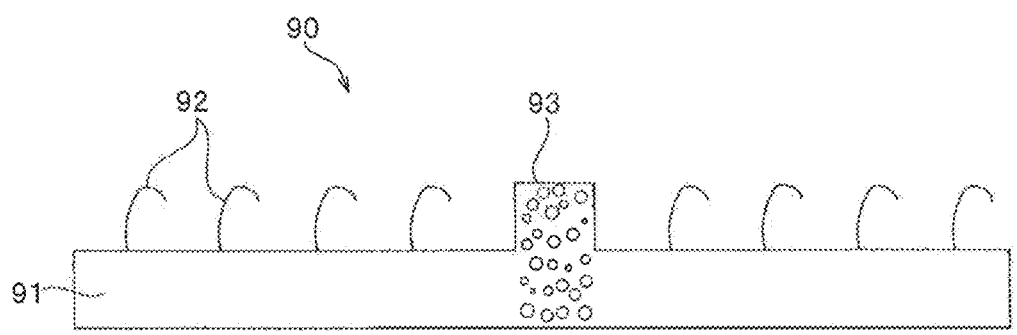
FIG. 20 is a cross-sectional view of the conventional molded surface fastener.

It should be noted that the magnetic raised portion 54 of Embodiment 2 can possibly have other shapes having cross sections as shown in above described FIG. 12 and FIG. 13, for example. As the molded surface fastener 2a according to a modification example of Embodiment 2 is shown in FIG. 18, a width dimension of the magnetic raised portion 54a can be larger than a width dimension of the engaging elements 12, or can be smaller to the contrary as long as the magnetic raised portion 54a is disposed between the engaging elements 12 adjacent in a length direction.

Further, in the molded surface fastener 1 of Embodiment 1 and the molded surface fastener 2 of Embodiment 2, as described above, one continuous magnetic region 18, 58 is formed along a length direction with a constant width dimension between the right and left resin intrusion barrier portions 20, 60. However, in the invention, the plurality of magnetic regions may be formed along the length direction with a constant width dimension between the right and left resin intrusion barrier portions 20, 60. In this case, a non-magnetic region containing substantially no magnetic particles is formed along the length direction between each of the magnetic regions. In addition, it is preferable that a total value adding each of the width dimensions of the plurality of magnetic regions is 50% or more of an interval between the right and left resin intrusion barrier portions. Further in the invention, since the magnetic particles are entirely contained in the molded surface fastener, the entire molded surface fastener may be formed of a magnetic region.

REFERENCE SIGNS LIST 1, 1a to 1c Molded surface fastener
2, 2a Molded surface fastener 10 Primary molded body
11 Base portion
12 Engaging element
12a Hook tip end
13 Element row
13a First element row
13b Second element row
13c Third element row
13d Fourth element row
13e Fifth element row
14 Magnetic raised portion
14a to 14c Magnetic raised portion
15 Fin piece portion
16 Lateral wall portion
18 Magnetic region
19 Engaging region
20 Resin intrusion barrier portion
21 Vertical wall row
21a First vertical wall row
21b Second vertical wall row
21c Third vertical wall row
22 Divided vertical wall portion (Vertical wall portion)
23 Connecting portion
24 Reinforcement portion
30 Primary resin intrusion barrier portion
31 Primary vertical wall row
31a Primary first vertical wall row
31b Primary second vertical wall row
31c Primary third vertical wall row
32 Primary divided vertical wall portion
40 Manufacturing apparatus
41 Molding apparatus
42 Die wheel
43 Extrusion nozzle
43a First flow path
43b Second flow path
43c Extruding surface
44 Pickup roller
45 Heat pressure apparatus
45a Upper side pressure roller (Calender roller)
45b Lower side pressure roller (Calender roller)
46 Molding die
46a Fastener holding portion
47 Cavity surface (Fastener attaching surface)
48 Magnet
49 Cushion body (Foam body)
53 Element row
53a First element row
53b Second element row
53c Third element row
53d Fourth element row
53e Fifth element row
54, 54a Magnetic raised portion
56 Lateral wall portion
58 Magnetic region
59 Engaging region
60 Resin intrusion barrier portion
61 Vertical wall row
61a First vertical wall row
61b Second vertical wall row
62 Divided vertical wall portion
63 Continuous vertical wall portion
H1 Height dimension of magnetic raised portion from base portion
H2 Maximum height dimension of engaging element from base portion
H3 Height dimension of hook tip end of engaging element from base portion

The invention claimed is:

1. A molded surface fastener made of synthetic resin which is integrated to a surface of a cushion body when foam molding of the cushion body, the molded surface fastener comprising:
a flat plate-shaped base portion, right and left resin intrusion barrier portions standing along a length direction on an upper surface of the base portion, and a plurality of hook-shaped engaging elements disposed between the right and left resin intrusion barrier portions, in which a magnetic region containing magnetic particles in the synthetic resin is formed along the length direction in at least a part between the right and left resin intrusion barrier portions,
wherein magnetic raised portions integrally formed with the base portion and rising from the upper surface of the base portion such that a height dimension in a vertical direction is lower than the engaging elements and containing the magnetic particles therein are disposed alternately between the engaging elements adjacent in the length direction within the magnetic region,
the magnetic raised portions are formed on at least a position interposed by the adjacent engaging elements in the length direction.

2. The molded surface fastener according to claim 1,
wherein the magnetic particles are contained in the engaging elements and a part of the base portion within the magnetic region, and
a lower surface portion of the base portion is formed of synthetic resin containing no magnetic particles or synthetic resin containing magnetic particles at a ratio of 10 wt % or less.

3. The molded surface fastener according to claim 1,
wherein the engaging element comprises a rising portion rising from the base portion and a hook-shaped engaging head portion curving and extending in a front and rear direction from an upper end of the rising portion, and
the magnetic raised portion is formed between the engaging head portions of the adjacent engaging elements and is provided lower than a height position of a hook tip end of the engaging head portion in the engaging element.

4. The molded surface fastener according to claim 3,
wherein a height dimension (H1) in a vertical direction of the magnetic raised portion from the base portion is set to be ¾ or less of a height dimension (H3) in a vertical direction of the hook tip end of the engaging element from the base portion.

5. The molded surface fastener according to claim 1,
wherein a height dimension (H1) in a vertical direction of the magnetic raised portion from the base portion is set to be ⅓ or more of a height dimension (H2) in a vertical direction of the engaging element from the base portion.

6. The molded surface fastener according to claim 1,
wherein a cross section orthogonal to a width direction of the magnetic raised portion is formed such that a dimension in a length direction of the magnetic raised portion gradually decreases as being apart from the base portion.

7. The molded surface fastener according to claim 1,
wherein a cross section orthogonal to a width direction of the magnetic raised portion has a triangle, rectangular, or trapezoidal shapes.

8. The molded surface fastener according to claim 1, wherein the magnetic region is disposed bisymmetrically about a center position along a length direction between the right and left resin intrusion barrier portions, and a dimension in a width direction of the magnetic region is set to be 50% or more of an interval between the right and left resin intrusion barrier portions.

9. The molded surface fastener according to claim 1, wherein the plurality of engaging elements is disposed so as to align in a length direction and a width direction.

10. The molded surface fastener according to claim 9, wherein the magnetic raised portions are continuously provided along a width direction.

11. The molded surface fastener according to claim 9, wherein the magnetic raised portions are intermittently provided along a width direction at a constant interval.

12. The molded surface fastener according to claim 1, wherein the plurality of engaging elements and a plurality of the magnetic raised portions are aligned in a length direction and disposed alternately in rows adjacent in a width direction.

\* \* \* \* \*